US009402271B2

(12) United States Patent
Narayanasamy

(10) Patent No.: US 9,402,271 B2
(45) Date of Patent: Jul. 26, 2016

(54) CONVERGED WIRELESS LOCAL AREA NETWORK

(75) Inventor: Senthilkumar Narayanasamy, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 80 days.

(21) Appl. No.: 13/345,566

(22) Filed: Jan. 6, 2012

(65) Prior Publication Data

US 2012/0327836 A1 Dec. 27, 2012

Related U.S. Application Data

(60) Provisional application No. 61/501,660, filed on Jun. 27, 2011.

(51) Int. Cl.
*H04W 76/02* (2009.01)
*H04W 12/06* (2009.01)

(52) U.S. Cl.
CPC ............ *H04W 76/022* (2013.01); *H04W 12/06* (2013.01)

(58) Field of Classification Search
CPC .............. H04L 12/4633; H04L 49/357; H04L 67/1097; H04L 12/4625; H04L 45/66; H04L 49/70; H04L 12/4641; H04L 41/0213; H04L 41/0803; H04L 45/02; H04L 49/65; H04L 12/462; H04L 29/12066; H04L 41/12; H04W 12/06; H04W 76/022

See application file for complete search history.

(56) References Cited

U.S. PATENT DOCUMENTS

| 2009/0232031 | A1* | 9/2009 | Vasseur ................. H04L 12/185 370/256 |
| 2011/0299535 | A1* | 12/2011 | Vobbilisetty ........ H04L 12/4625 370/392 |
| 2012/0044944 | A1* | 2/2012 | Kotha et al. .................... 370/401 |
| 2012/0204224 | A1* | 8/2012 | Wang et al. ....................... 726/3 |
| 2012/0243539 | A1* | 9/2012 | Keesara ........................ 370/392 |
| 2012/0243544 | A1* | 9/2012 | Keesara ................... 370/395.53 |
| 2012/0287939 | A1* | 11/2012 | Leu et al. ........................ 370/409 |

OTHER PUBLICATIONS

WIMETRONET—A Scalable Wireless Network for Metropolitan Transports: Published in Telecommunications (AICT), 2010 Sixth Advanced International Conference; Date of Conference: May 9-15, 2010; p. 520-525; Print ISBN: 978-1-4244-6748-8.*

(Continued)

*Primary Examiner* — Andrew Lai
*Assistant Examiner* — M Mostazir Rahman
(74) *Attorney, Agent, or Firm* — Shun Yao; Park, Vaughan, Fleming & Dowler LLP

(57) ABSTRACT

One embodiment of the present invention provides a wireless network controller. The wireless network controller includes a data structure, a tunnel management scheme, an encapsulation mechanism, and a forwarding mechanism. The data structure stores a TRILL RBridge identifier associated with a remote wireless network controller. The tunnel management mechanism maintains a tunnel with a local access point, and the encapsulation mechanism encapsulates a packet received from the tunnel with a TRILL header which includes the RBridge identifier of the remote wireless network controller. The forwarding mechanism forwards the encapsulated packet.

21 Claims, 19 Drawing Sheets

| WNC | MAC ADDRESS | VLAN | IP ADDRESS | LOCATION |
|---|---|---|---|---|
| WNC 101 | MAC 152 | VLAN 132 | IP 154 | LOC. 156 |
| WNC 102 | MAC 162 | VLAN 134 | IP 164 | LOC. 166 |
| WNC 103 | MAC 172 | VLAN 136 | IP 174 | LOC. 176 |

(56) References Cited

OTHER PUBLICATIONS

Challenges and Opportunities in the Design of Trill: A Routed Layer 2 Technology: Published in: GLOBECOM Workshops, 2009 IEEE; Date of Conference: Nov. 30, 2009-Dec. 4, 2009; Conference location: Honolulu, HI; pp. 1-6; E-ISBN: 978-1-4244-5626-0; Digital Object Identifier: 10.1.109/GLOCOMW.2009.5360776.*
(Control and Provisioning of Wireless Access Points (CAPWAP) Protocol Specification, Request for comments: 5415 (Mar. 2009).*

* cited by examiner

| WNC | MAC ADDRESS | VLAN | IP ADDRESS | LOCATION |
|---|---|---|---|---|
| WNC 101 | MAC 152 | VLAN 132 | IP 154 | LOC. 156 |
| WNC 102 | MAC 162 | VLAN 134 | IP 164 | LOC. 166 |
| WNC 103 | MAC 172 | VLAN 136 | IP 174 | LOC. 176 |

FIG. 1B

| DEVICE | MAC ADDRESS | VLAN | IP ADDRESS | SSID | HOME WNC | FOREIGN WNC | MULTICAST | AP |
|---|---|---|---|---|---|---|---|---|
| DEVICE 122 | MAC 181 | VLAN 132 | IP 182 | 199 | WNC 101 | NA | IP 183 | AP 111 |
| DEVICE 124 | MAC 184 | VLAN 134 | IP 185 | 199 | WNC 102 | NA | IP 186 | AP 114 |
| DEVICE 126 | MAC 187 | VLAN 136 | IP 188 | 199 | WNC 103 | NA | IP 189 | AP 115 |

FIG. 1C

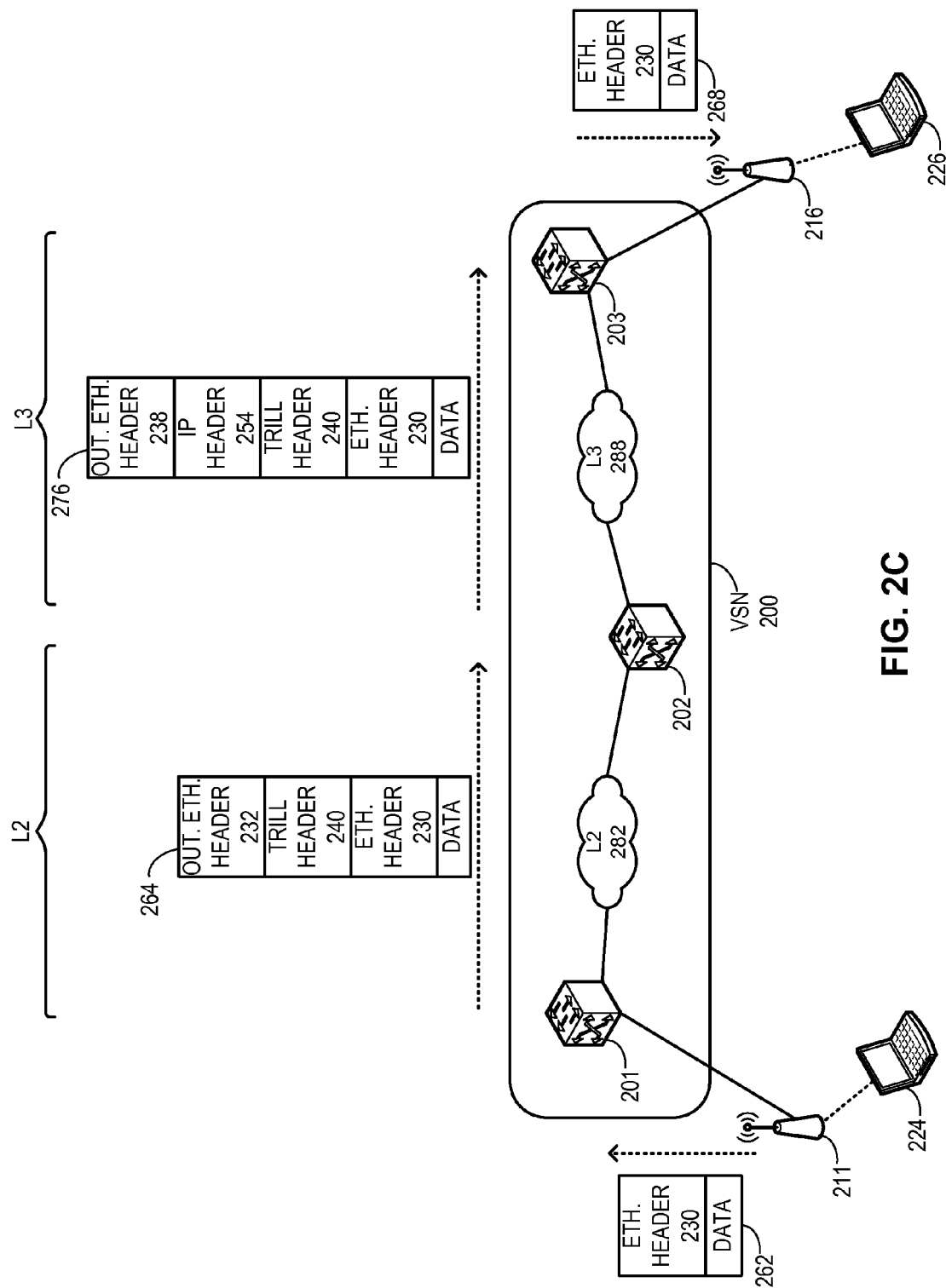

370

| DEVICE | MAC ADDRESS | VLAN | IP ADDRESS | SSID | HOME WNC | FOREIGN WNC | MULTICAST | AP |
|---|---|---|---|---|---|---|---|---|
| DEVICE 322 | MAC 381 | VLAN 332 | IP 382 | 399 | WNC 301 | NA | IP 383 | AP 311 |

380

| DEVICE | MAC ADDRESS | VLAN | IP ADDRESS | SSID | HOME WNC | FOREIGN WNC | MULTICAST | AP |
|---|---|---|---|---|---|---|---|---|
| DEVICE 322 | MAC 381 | VLAN 332 | IP 382 | 399 | WNC 302 | NA | IP 383 | AP 314 |

| DEVICE | MAC ADDRESS | VLAN | IP ADDRESS | SSID | HOME WNC | FOREIGN WNC | MULTICAST | AP |
|---|---|---|---|---|---|---|---|---|
| DEVICE 322 | MAC 381 | VLAN 332 | IP 382 | 399 | WNC 302 | WNC 303 | IP 383 | AP 315 |

FIG. 3D

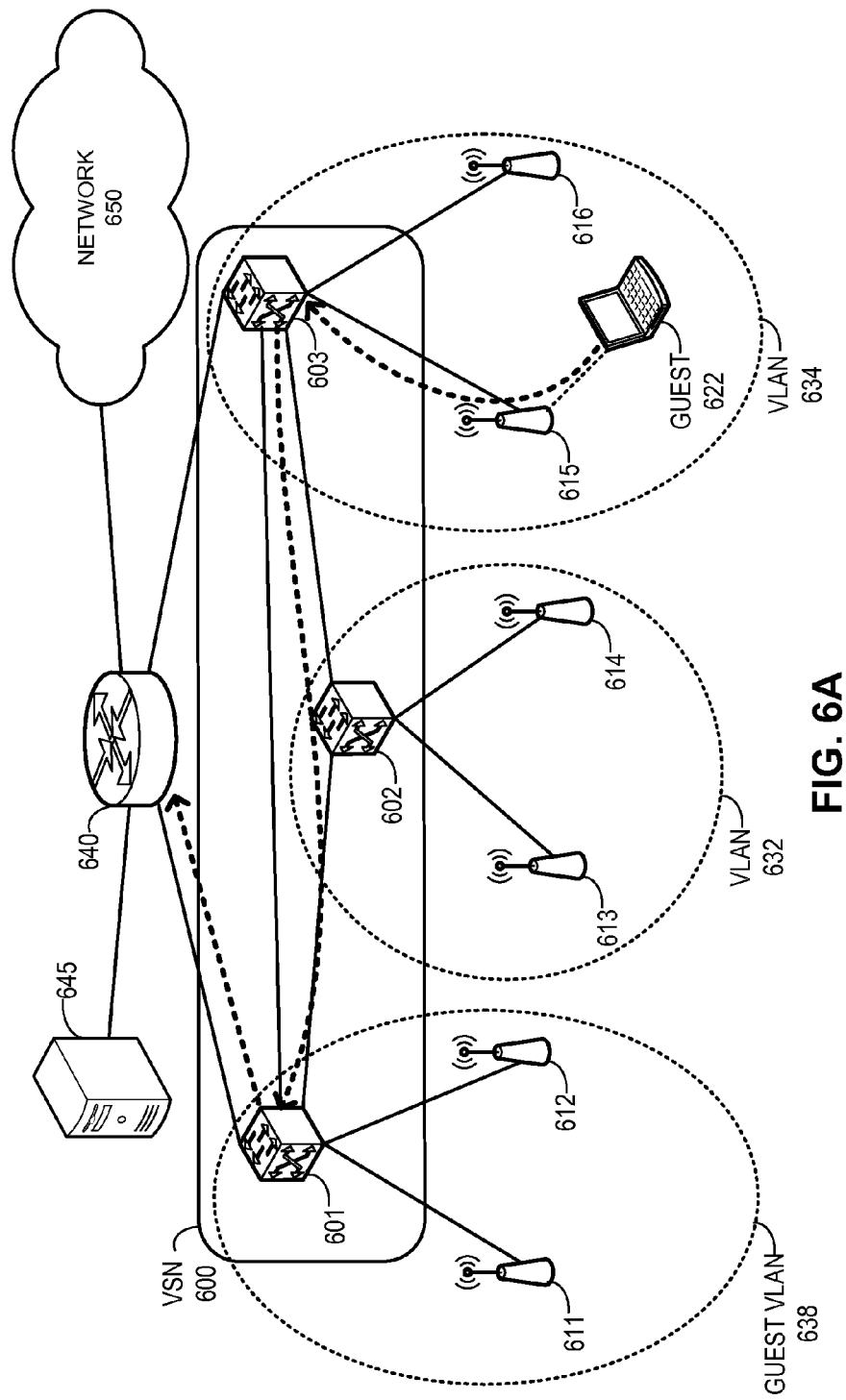

CONVERGED WIRELESS LOCAL AREA NETWORK

RELATED APPLICATION

This application claims the benefit of U.S. Provisional Application No. 61/501,660, titled "Converged Wireless LAN," by inventor Senthilkumar Narayanasamy, filed 27 Jun. 2011, which is incorporated by reference herein.

BACKGROUND

1. Field

The present disclosure relates to network management. More specifically, the present disclosure relates to a method and system for creating a converged wireless local area network (WLAN).

2. Related Art

Increasing demand for "anytime, anywhere" connectivity has made wireless networks a popular delivery medium for the Internet. Wireless user devices, equipped with increasing processing power and media play-back capability, have brought an increasing demand for wireless bandwidth. As a result, equipment vendors race to build intelligent wireless network control devices with versatile capabilities, such as roaming, to utilize wireless bandwidth and manage users efficiently. However, the number of users managed by each such device cannot grow infinitely. It is limited by bandwidth, processing capacity, power consumption, and design complexity, to name a few factors. Furthermore, wireless network controllers with high capability are usually more complex and expensive. More importantly, because an overly large and complex system often does not provide economy of scale, simply increasing the size and capability of a controller may prove economically unviable due to the increased cost and decreased efficiency.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

Nonetheless, these layer-2 technological advances have yet to benefit the deployment of intelligent wireless network controllers.

SUMMARY

One embodiment of the present invention provides a wireless network controller. The wireless network controller includes a data structure, a tunnel management mechanism, an encapsulation mechanism, and a forwarding mechanism. The data structure stores a TRILL RBridge identifier associated with a remote wireless network controller. The tunnel management mechanism maintains a tunnel with a local access point, and the encapsulation mechanism encapsulates a packet received from the tunnel with a TRILL header which includes the RBridge identifier of the remote wireless network controller. The forwarding mechanism forwards the encapsulated packet.

In a variation on this embodiment, the wireless network controller further includes a second data structure that stores identifying information associated with a remote wireless device coupled to a remote access point, wherein the remote access point is coupled to the remote wireless network controller.

In a further variation on this embodiment, the wireless network controller includes a packet processor that recognizes an identifier to a remote end device belonging to a virtual local area network (VLAN) in the packet, wherein the end device corresponds to an entry in the second data structure and the VLAN is not locally configured. Furthermore, the tunnel management mechanism instructs the local access point to accept and process data packets from the end device, wherein the data packet contains a tag corresponding to the VLAN.

In a further variation on this embodiment, the wireless network controller also includes a handover management mechanism that notifies a remote wireless network controller about an end device wirelessly coupled to the local access point, wherein the end device belongs to a locally configured VLAN and is authenticated at the remote wireless network controller.

In a further variation on this embodiment, the packet processor of the wireless network controller also identifies a packet encapsulated with an inner Ethernet header, a TRILL header, and an outer header, wherein the outer header is a layer-2 or a layer-3 header.

In a variation on this embodiment, the wireless network controller also includes a third data structure that stores multicast group membership information learned at a remote wireless network controller. Furthermore, the multicast management mechanism of the wireless network controller elects the wireless network controller to distribute multicast traffic of the multicast group to the remote wireless network controller in response to receiving a first join request to the multicast group from an end device wirelessly coupled to the local access point.

In a variation on this embodiment, the wireless network controller also includes an Address Resolution Protocol (ARP) module that responds to an ARP request for an end device, wherein the end device corresponds to an entry in the second data structure.

BRIEF DESCRIPTION OF THE FIGURES

FIG. 1B illustrates an exemplary data stricture for a controller information database containing information of all wireless network controllers associated with a virtual service network, in accordance with an embodiment of the present invention.

FIG. 1C illustrates an exemplary structure for a device information database containing information of all end devices associated a virtual service network, in accordance with an embodiment of the present invention.

FIG. 2C illustrates an exemplary communication between two wireless end devices coupled to two wireless network controllers, wherein the wireless network controllers are coupled via a hybrid layer-2 and layer-3 network, in accordance with an embodiment of the present invention.

FIG. 3C illustrates an update to a device information database for layer-2 roaming, in accordance with an embodiment of the present invention.

FIG. 3D illustrates an update to a device information database for layer-3 roaming, in accordance with an embodiment of the present invention.

FIG. 6A illustrates an exemplary access process of a guest wireless end device using infrastructure, in accordance with an embodiment of the present invention.

FIG. 6B illustrates an entry to a device information database for a guest device, in accordance with an embodiment of the present invention.

DETAILED DESCRIPTION

Figure 1A:
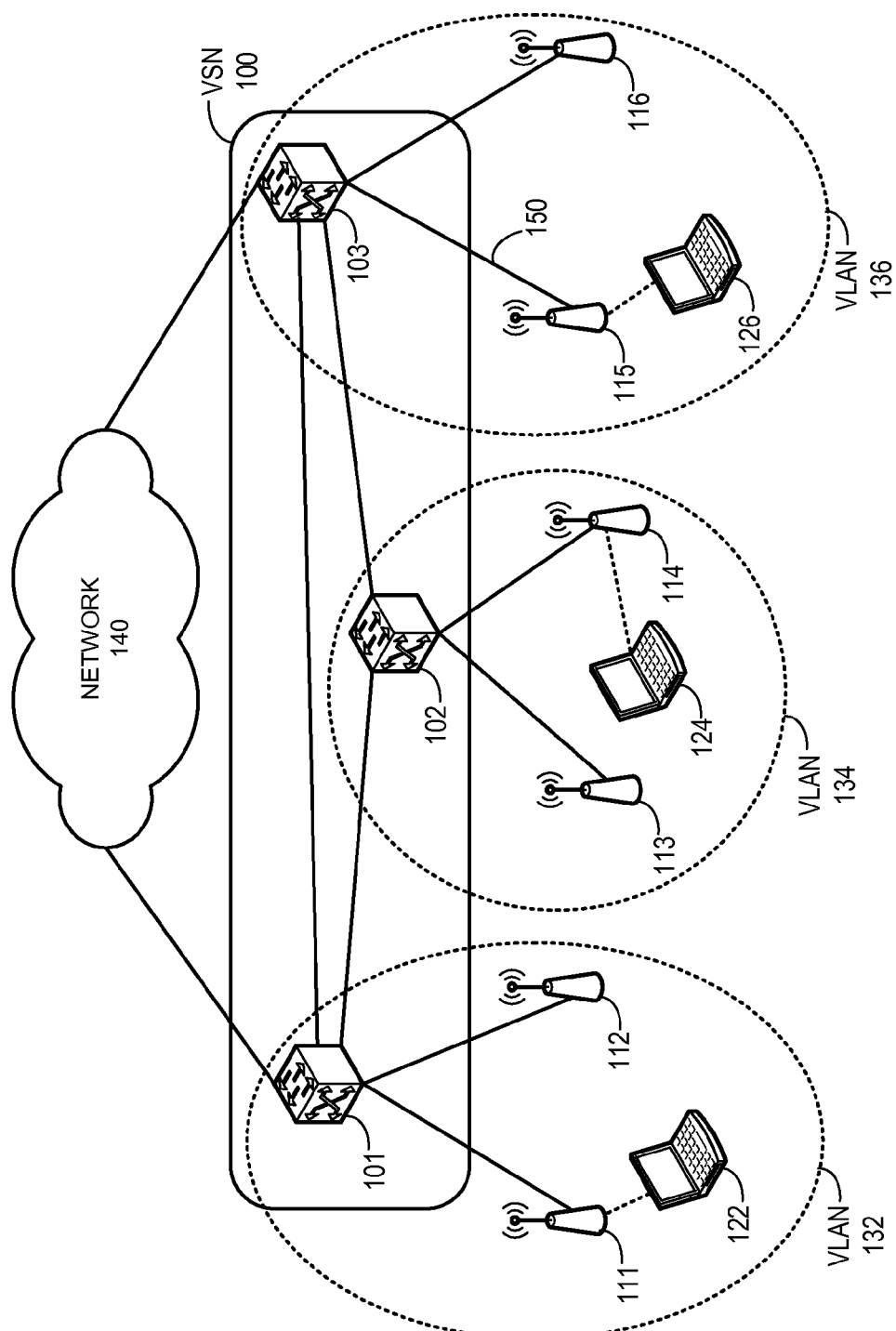
FIG. 1A illustrates an exemplary converged wireless LAN that includes a plurality of wireless network controllers that are TRILL capable, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of accommodating an increasing number of users while providing seamless mobility and reliability in a wireless LAN (WLAN) is solved by creating a converged WLAN architecture based on decentralized wireless network controllers. These controllers can be coupled with each other over a network, namely a virtual service network, that provides wireless LAN service to end devices. In a virtual service network, each wireless network controller maintains identifying information for all remote wireless network controllers and stores the information in a controller information database. The virtual service network can be a TRILL network and each wireless network controller can be capable of processing TRILL packets. Under such a scenario, each such controller acts as an RBridge and the identifying information associated with the controller is an RBridge identifier. All wireless network controllers in the virtual service network use the end device information learnt from local access points (APs) and from remote wireless network controllers to collectively make packet forwarding, roaming, virtual local area network (VLAN) access, and multicast forwarding decisions.

In some embodiments, a respective wireless network controller can be coupled to multiple APs. Each AP creates a forwarding tunnel to the wireless network controller it is associated with. In one embodiment, the tunnel is created using control and provisioning of wireless access points (CAPWAP), as described in IETF Request for Comments (RFC) "Control And Provisioning of Wireless Access Points (CAPWAP) Protocol Specification," available at http://www.ietf.org/rfc/rfc5415.txt, which is incorporated by reference herein. Each packet of a wireless end device coupled to an AP goes through the tunnel to the wireless network controller. During operation, a respective AP broadcasts an identifier allowing end devices to identify the AP. An end device senses the presence of an AP from a corresponding identifier and sends an association request to the AP. The AP forwards the request to the wireless network controller. This controller receives the request, learns the device information, and stores the information in a device information database. The controller then authenticates the end device, instructs the AP to allow wireless data communication from the end device, and forwards the learned device information to all remote wireless network controllers in the virtual service network. A respective remote wireless network controller receives the information and stores the information in its device information database. As a result, a respective wireless network controller is aware of all the wireless end devices coupled to the virtual service network.

As a wireless end device maintains a tether-less communication with an AP, the user of the wireless end device (and the end device as well) can move out of the wireless coverage of one AP and move into the wireless coverage of a second AP. This process is known as roaming. Even if the second AP is associated with a different second wireless network controller, this second controller has a record of the end device in its device information database. As a result, when the association request from the end device is forwarded to the second controller via the second AP, this second controller recognizes the device and instructs the second AP to allow wireless data communication from the end device. Note that, since all other wireless network controllers also learn the end device's information, the end device can perform subsequent roaming and move to the coverage of APs associated with another wireless network controller.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "edge port" refers to a port which sends/receives data frames in native Ethernet format. The term "TRILL port" refers to a port which sends/receives data frames encapsulated with a TRILL header and outer layer-2/layer-3 header.

The term "RBridge identifier" refers to a group of bits that can be used to identify an RBridge. Note that the TRILL standard uses "RBridge ID" to denote a 48-bit intermediate-system-to-intermediate-system (IS-IS) system ID assigned to an RBridge, and "RBridge nickname" to denote a 16-bit value that serves as an abbreviation for the "RBridge ID." In this disclosure, "RBridge identifier" is used as a generic term and is not limited to any bit format, and can refer to "RBridge ID," "RBridge nickname," or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram." In this disclosure, the terms "layer-2" and "media access control (MAC)" are used interchangeably.

In this disclosure, the term "wireless network controller" is used in a generic sense and refers to any device that can be used to manage one or more APs. The terms "wireless LAN controller" and "wireless network controller" are used interchangeably. The term "virtual service network" is also used in a generic sense, and refers to any physical and/or logical network that couples a plurality of wireless network controllers and facilitates information exchange among them. In some embodiments, a wireless network controller is also an RBridge. Hence, the terms "controller" and "RBridge" are used interchangeably.

In some embodiments, layer-3 processing capability can be enabled in wireless network controllers. Hence, the term "router" can refer to a standalone layer-3 (e.g., IP) router or the layer-3-capable portion of a wireless network controller. In this disclosure, the terms "layer-3" and "IP" are used interchangeably.

Network Architecture for Virtual Service Network

FIG. 1 illustrates an exemplary converged wireless LAN that includes a plurality of wireless network controllers that are TRILL capable, in accordance with an embodiment of the present invention. As illustrated in FIG. 1, a virtual service network 100 includes wireless network controllers 101, 102, and 103. APs 111 and 112 are coupled to controller 101, APs 113 and 114 are coupled to controller 102, and APs 115 and 116 are coupled to controller 103. Wireless network controllers 101-103, and APs 111-116 create a converged wireless LAN. End devices 122, 124, and 126 are wirelessly coupled to network 100 via APs 111, 114, and 115, respectively. Wireless network controllers 101, 102, and 103 are associated with VLANs 132, 134, and 136, respectively. Controllers 101 and 103 are coupled to a network 140. In one embodiment, network 140 is an external network. In another embodiment, network 140 is the wired part of a corporate network, wherein the corporate network further includes the converged wireless LAN.

Each wireless network controller in network 100 is aware of all other controllers in network 100. This awareness includes identifying and routing information associated with the controllers. For example, controller 101 maintains identifying and routing information for controllers 102 and 103, and keeps such information in a controller information database. In some embodiments, wireless network controllers in network 100 are TRILL capable and act as RBridges. These controllers use edge ports to communicate to the APs and TRILL ports to communicate among each other. For example, controller 102 is coupled to APs 113 and 114 via edge ports, and to controllers 101 and 103 via TRILL ports.

During operation, a tunnel is created between each AP and its corresponding controller. For example, a tunnel 150 is created between controller 103 and AP 115. When end device 126 associates itself with AP 115, all the messages sent from end device 126 are sent from AP 115 to controller 103 via tunnel 150. Controller 103 learns the device information and stores the information in a device information database. The device information includes identifying information for end device 126, VLAN information (in this example, VLAN 136), and the associated wireless network controller (in this example, controller 103). Controller 103 then authenticates end device 126, instructs AP 115 to allow wireless data communication from end device 126, and forwards the device information associated with end device 126 to controllers 101 and 102. In one embodiment, controller 103 encapsulates the information using a TRILL header and forwards the information using RBridge identifiers of controllers 101 and 102. Controllers 101 and 102 receive the information and store the information in their respective device information database. As a result, each controller is aware of end device 126. Similarly, information regarding end devices 122 and 124 is learned by controllers 101 and 102, respectively. Each controller, in turn, forwards the information to all other remote controllers.

During operation that does not involve creating a decentralized and distributed virtual service network, only one controller (assume controller 103) is selected as the master controller, and decisions regarding each wireless end device are made at the master controller. In this example, when end device 122 is associated with AP 111, the authentication is performed at controller 103. Similarly, when end device 124 is associated with AP 114, the authentication is also performed at controller 103. Furthermore, if end device 122 moves from the coverage of AP 111 to another AP, the handoff decision will also be managed by controller 103. Under such a scenario, all wireless end devices coupled to all APs send their control information to controller 103, and as a result, bandwidth consumption and processing requirements at controller 103 continue to increase. Hence, a centralized solution does not scale to accommodate a large number of wireless end devices in a wireless LAN.

In embodiments of the present invention, as illustrated in FIG. 1, when end device 122 is associated with AP 111, the authentication is performed at the local controller 101. Similarly, when end device 124 is associated with AP 114, the authentication is performed at the respective local controller 102. Moreover, if end device 122 moves from the coverage of AP 111 to another AP, the handoff decision is managed by controller 101. Under such a scenario, a wireless end device coupled to an AP sends its control information to a local controller, and the corresponding decision is made locally in a distributed manner. Furthermore, each controller updates other controllers regarding the changes in the virtual service network. As a result, though decentralized, each wireless network controller can make decisions based on a complete set of knowledge about the network.

Note that TRILL is only used as a transport between the switches within network 100. This is because TRILL can readily accommodate native Ethernet frames. Also, the TRILL standards provide a ready-to-use forwarding mechanism that can be used in any routed network with arbitrary topology. Embodiments of the present invention should not be limited to using only TRILL as the transport. Other protocols (such as Internet protocol (IP) or multi-protocol label switching (MPLS)), either public or proprietary, can also be used for the transport.

FIG. 1B illustrates an exemplary data stricture for a controller information database containing information of all wireless network controllers associated with a virtual service network, in accordance with an embodiment of the present invention. The controller information database in FIG. 1B contains wireless network controller information for wireless network controllers 101, 102, and 103 in FIG. 1A. For example, the entry associated with wireless network controller 101 contains an identifier to controller 101, and MAC address 152 and IP address 154 of controller 101 and associated VLAN 132. In some embodiments, the identifier is an RBridge identifier. The entry may optionally contain location 156 of the wireless network controller 101 as well. Similarly, the entry associated with wireless network controller 102 contains an identifier to controller 102, and corresponding MAC address 162, VLAN 134, IP address 164, and location 166, and the entry associated with wireless network controller 103 contains an identifier to controller 103, and corresponding MAC address 172, VLAN 136, IP address 174, and location 176, as described in conjunction with FIG. 1A.

Constructing the controller information database is essential for formation of a virtual service network. In some embodiments, the wireless network controllers in a virtual service network use multicast to discover one another. For example, each wireless network controller discovers another controller in the network by exchanging the multicast group join messages. A recipient controller replies the join message by sending a response to the message originator. In this way, a controller populates a controller information database. As soon as two controllers are discovered (e.g., an entry in the respective controller information database is created, as described in conjunction with FIG. 1B), the controllers exchange their respective address to form a point-to-point tunnel between them in the virtual service network. This tunnel can be considered as a link over the virtual service network. In some embodiments, a user controls the tunnel formation between two controllers. The user logs in to each controller and configures a point-to-point tunnel as need.

FIG. 1C illustrates an exemplary structure for a device information database containing information of all end devices associated a virtual service network, in accordance with an embodiment of the present invention. The device information database in FIG. 1C contains device information for end devices 122, 124, and 126 in FIG. 1A. For example, the entry associated with end device 122 contains an identifier to end device 122, and MAC address 181, IP address 182, and multicast address 183 of end device 122, associated VLAN 132 and AP 111. In some embodiments, the identifier is a device name. As end device 122 initiates the connection under the coverage of wireless network controller 101, the entry also contains controller 101 as the home wireless network controller. Furthermore, the as the entry is not roaming, there is no record in the entry corresponding to the home wireless network controller. The entry also contains the SSID 199 associated with AP 111. Similarly, the entry associated with end device 124 contains an identifier to end device 122, and corresponding MAC address 184, VLAN 134, IP address 185, SSID 199, home wireless network controller 102, multicast IP address 186, and AP 114, and the entry associated with end device 126 contains an identifier to end device 122, and corresponding MAC address 187, VLAN 136, IP address 188, SSID 199, home wireless network controller 103, multicast IP address 189, and AP 115, as described in conjunction with FIG. 1A.

Communication over Virtual Service Network

Figure 2A:
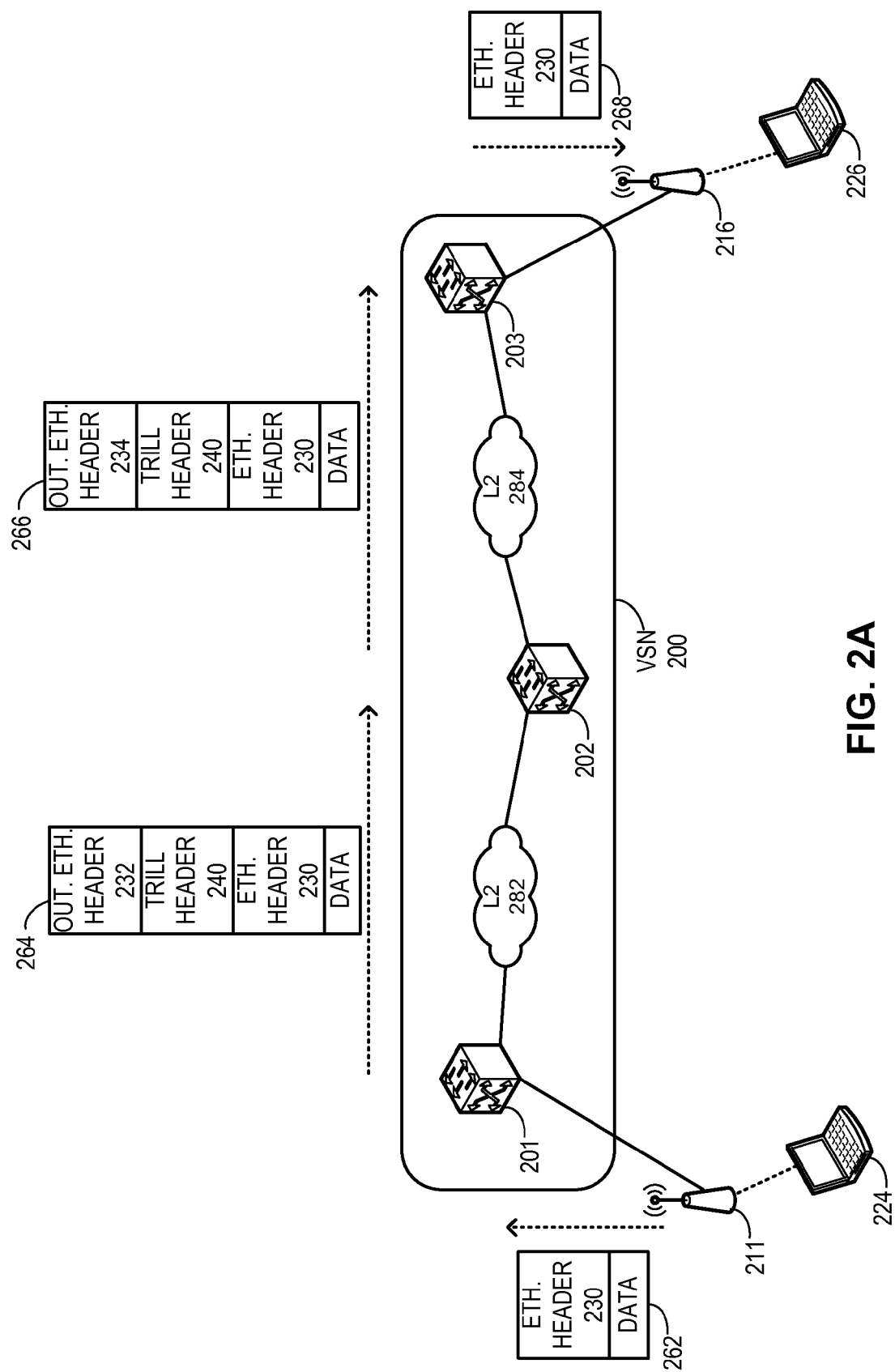
FIG. 2A illustrates an exemplary communication between two wireless end devices coupled to two wireless network controllers, wherein the wireless network controllers are coupled via a layer-2 network, in accordance with an embodiment of the present invention.

In some embodiments, a virtual service network is a logical TRILL network over one or more physical networks. The physical networks on which the logical network is established can be layer-2, layer-3, or a hybrid of layer-2 and layer-3 networks. FIG. 2A illustrates an exemplary communication between two wireless end devices coupled to two wireless network controllers, wherein the wireless network controllers are coupled via a layer-2 network, in accordance with an embodiment of the present invention. In this example, virtual service network 200 includes wireless network controllers 201, 202, and 203. Controllers 201 and 202, and controllers 202 and 203 are coupled via physical layer-2 networks 282 and 284, respectively. APs 211 and 216 are coupled to controllers 201 and 203, respectively. End devices 224 and 226 are coupled to APs 211 and 216, respectively.

During operation, end device 224 sends a data frame 262 to end device 226. In some embodiments, the data frame is encapsulated in an Ethernet header 230 with source MAC address corresponding to end device 224 and destination MAC address corresponding to end device 226. Controller 201 encapsulates data frame 262 in a TRILL header 240 and an outer Ethernet header 232, and sends TRILL frame 264 over layer-2 network 282 toward egress controller 203 via intermediate controller 202. The frame is forwarded over network 282 using outer Ethernet header 232 to controller 202. Upon receiving frame 264, controller 202 examines TRILL header 240 to identify the egress controller, encapsulates frame 266 using outer Ethernet header 234, and forwards the frame over layer-2 network 284. Controller 203 receives the frame, removes outer Ethernet and TRILL encapsulations, and delivers frame 268 to end device 226 via AP 216. Note that outer Ethernet headers 232 and 234 are responsible for forwarding the frame over physical layer-2 networks 282 and 284, respectively, while TRILL header 240 is responsible for forwarding the frame over the virtual service network.

Figure 2B:
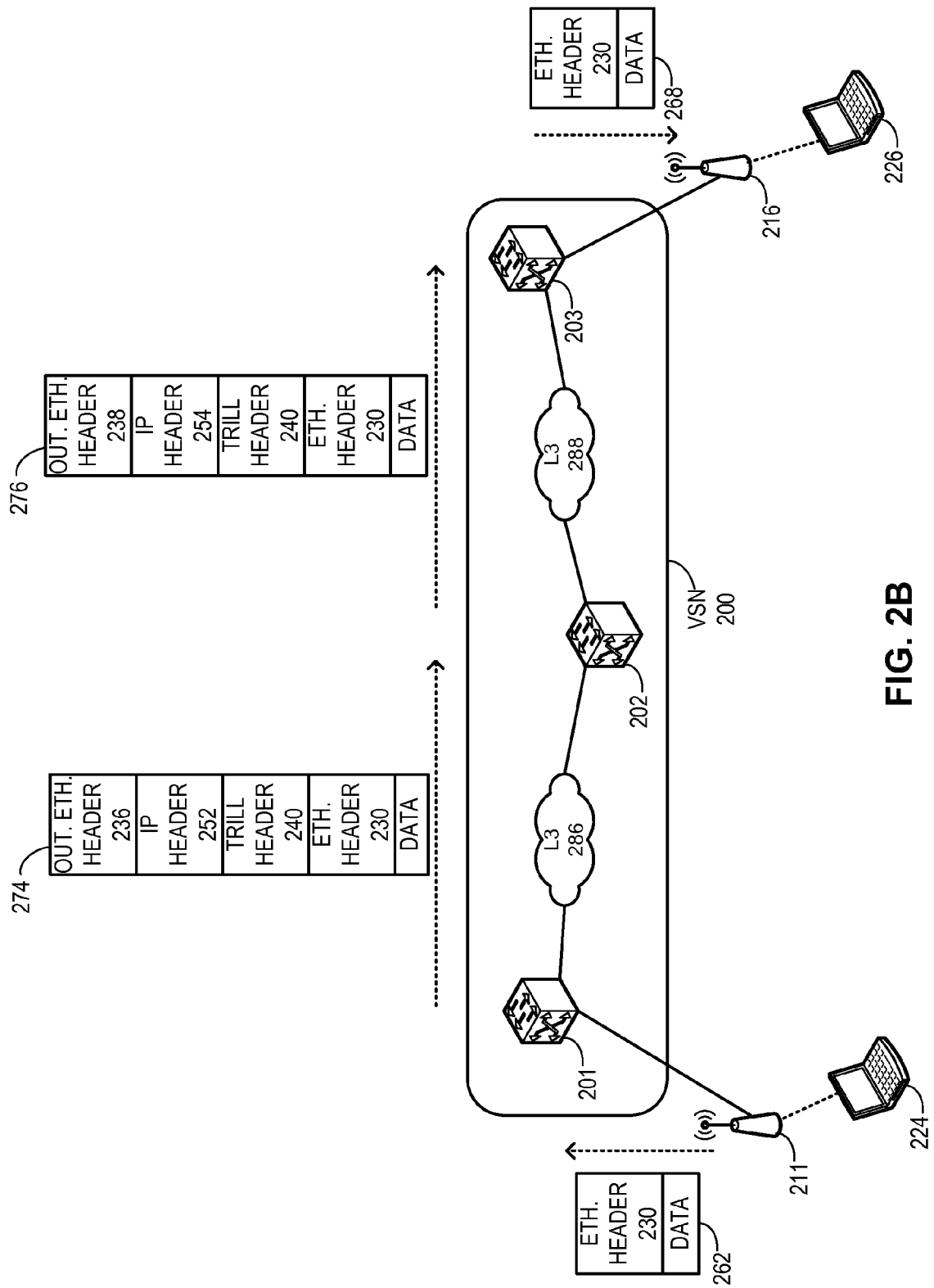
FIG. 2B illustrates an exemplary communication between two wireless end devices coupled to two wireless network controllers, wherein the wireless network controllers are coupled via a layer-3 network, in accordance with an embodiment of the present invention.

FIG. 2B illustrates an exemplary communication between two wireless end devices coupled to two wireless network controllers, wherein the wireless network controllers are coupled via a layer-3 network, in accordance with an embodiment of the present invention. In this example, controllers 201 and 202, and controllers 202 and 203 are coupled via physical layer-3 networks 286 and 288, respectively, in virtual service network 200. During operation, when end device 224 sends a data frame 262 to end device 226, controller 201 encapsulates data frame 262 in a TRILL header 240. Controller 201 encapsulates the TRILL frame in an IP header 252, with source IP address corresponding to controller 201 and destination IP address corresponding to controller 202. Based on the IP addresses in IP header 252, encapsulated frame 274 is routed to controller 202 via layer-3 network 286. For each hop in network 286, an outer Ethernet header (separate headers for each hop, denoted by outer Ethernet header 236) is used to perform layer-2 forwarding for frame 274. Upon receiving the frame, controller 202 examines TRILL header 240 to identify the egress controller, encapsulates frame 276 using IP header 254 with source IP address corresponding to controller 202 and destination IP address corresponding to controller 203, and forwards the frame over layer-3 network 288. For each hop in network 288, a separate outer Ethernet header (denoted by outer Ethernet header 238) is used to perform layer-2 forwarding for frame 276. Controller 203 then receives the frame, removes IP and TRILL encapsulations, and delivers frame 268 to end device 226 via AP 216. Here, IP headers 252 and 254 are used for routing the frame over physical layer-3 networks 286 and 288, respectively.

FIG. 2C illustrates an exemplary communication between two wireless end devices coupled to two wireless network controllers, wherein the wireless network controllers are coupled via a hybrid layer-2 and layer-3 network, in accordance with an embodiment of the present invention. In this example, controllers 201 and 202 are coupled via physical layer-2 network 282, and controllers 202 and 203 are coupled via physical layer-3 network 288 in virtual service network 200. During operation, when end device 224 sends a data frame 262 to end device 226, controller 201 encapsulates data frame 262 in a TRILL header 240 and an outer Ethernet header 232, and sends TRILL frame 264 toward egress controller 203 via intermediate controller 202 over layer-2 network 282. The frame is forwarded over network 282 using outer Ethernet header 232 to controller 202. Upon receiving frame 264, controller 202 examines TRILL header 240 to identify the egress controller 203. However, the physical network that couples controllers 202 and 203 is a layer-3 (e.g., IP) network. Hence, controller 202 encapsulates the TRILL frame in an IP header 254, with source IP address corresponding to controller 202 and destination IP address corresponding to controller 203. Based on IP addresses in IP header 254, encapsulated frame 276 is routed to controller 203. For each hop in network 288, a separate outer Ethernet header (denoted by outer Ethernet header 238) is used to perform layer-2 forwarding for frame 276. Controller 203 receives the frame, removes IP and TRILL encapsulations, and delivers frame 268 to end device 226 via AP 216. In this example, virtual service network 200 is constructed over a layer-2 and a layer-3 physical network. Hence, outer Ethernet header 232 is responsible for forwarding the frame over physical layer-2 network 282, and IP header 254 is used for routing the frame over physical layer-3 network 288.

Roaming in Virtual Service Network

Figure 3A:
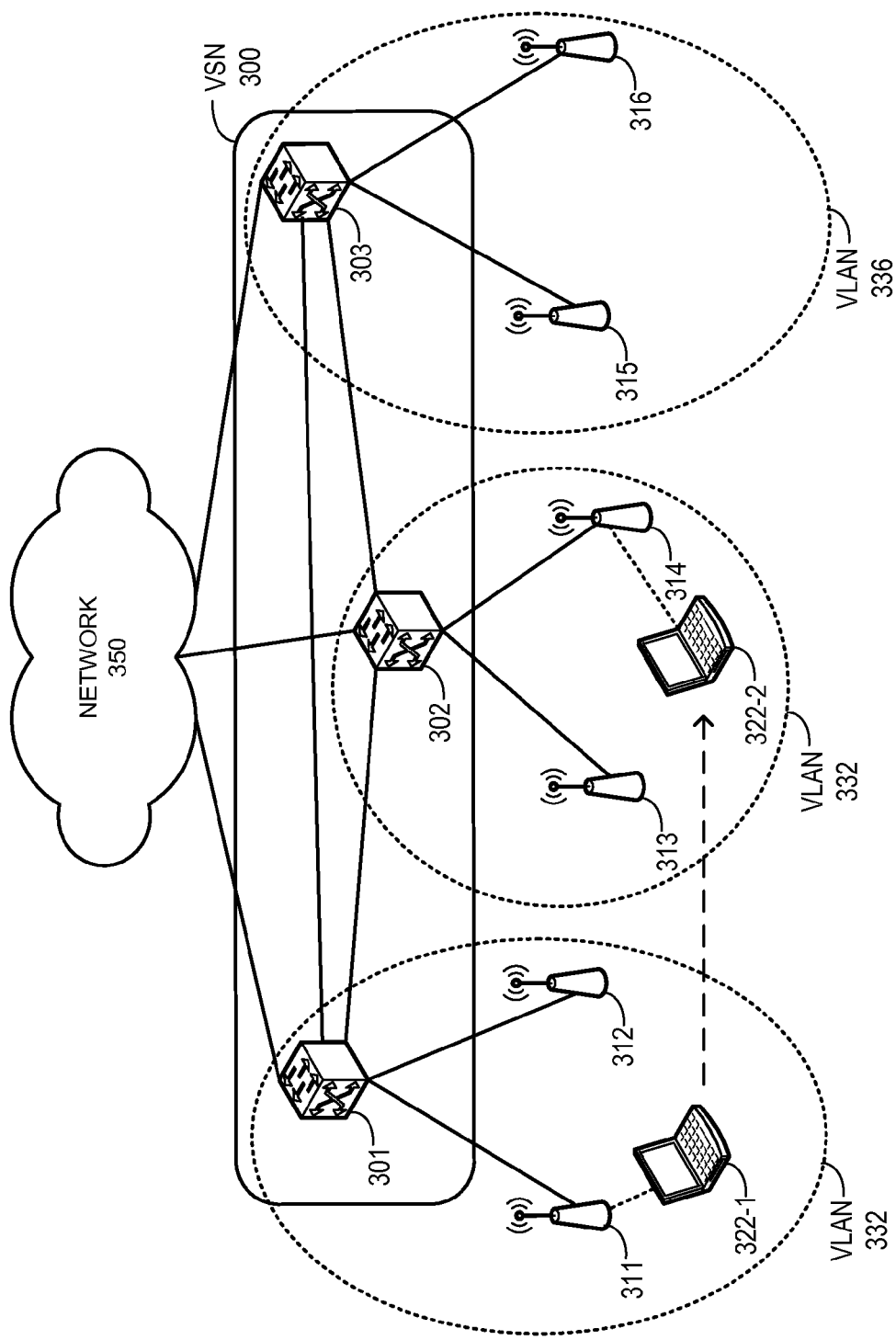
FIG. 3A illustrates an exemplary layer-2 roaming of a wireless end device between two wireless network controllers belonging to the same VLAN, in accordance with an embodiment of the present invention.

As all wireless network controllers are logically and/or physically coupled with each other on a virtual service network, information regarding any wireless end device can be shared among the controllers. This facilitates the seamless roaming of a wireless end device from the coverage of an AP associated with a controller to the coverage of another AP associated with a different controller. FIG. 3A illustrates an exemplary layer-2 roaming of a wireless end device between two wireless network controllers belonging to the same VLAN, in accordance with an embodiment of the present invention. In this example, virtual service network 300 includes wireless network controllers 301, 302, and 303. APs 311 and 312 are coupled to controller 301, APs 313 and 314 are coupled to controller 302, and APs 315 and 316 are coupled to controller 303. Wireless network controllers 301 and 302 are associated with VLAN 332, and controller 303 is associated with VLAN 336. End device 322 belongs to VLAN 332. Wireless network controllers 301, 302, and 303 are coupled to a network 350.

During operation, end device 322 initiates a wireless communication under the coverage of AP 311 (denoted as 322-1) and wirelessly sends an association request to controller 301 via AP 311. Controller 301 associates end device 322 with VLAN 332, assigns itself as the "home" controller of end device 322, and sends device information of end device 322 to other wireless network controllers in network 300. In some embodiment, the device information associated with an end device includes identifying information of the end device, and associated VLAN, AP, and home controller information. End device 322 then starts a communication with network 350 via AP 311 while controllers 302 and 303 store the device information in their respective device information database. After a while, end device 322 roams to the coverage of AP 314 (denoted as 322-2) and sends an association request to AP 314. AP 314 receives the request and forwards the request to controller 302. As controller 302 is associated with VLAN 332 as well, end device 322 still remains within its VLAN. Furthermore, controller 302 already contains the device information associated with end device 322. Hence, controller 302 instructs AP 314 to allow the association with end device 322, assigns itself as the home controller, and informs other controllers about the new association. Consequently, data communication from end device 322 to network 350 continues via AP 314 and wireless network controller 302.

Figure 3B:
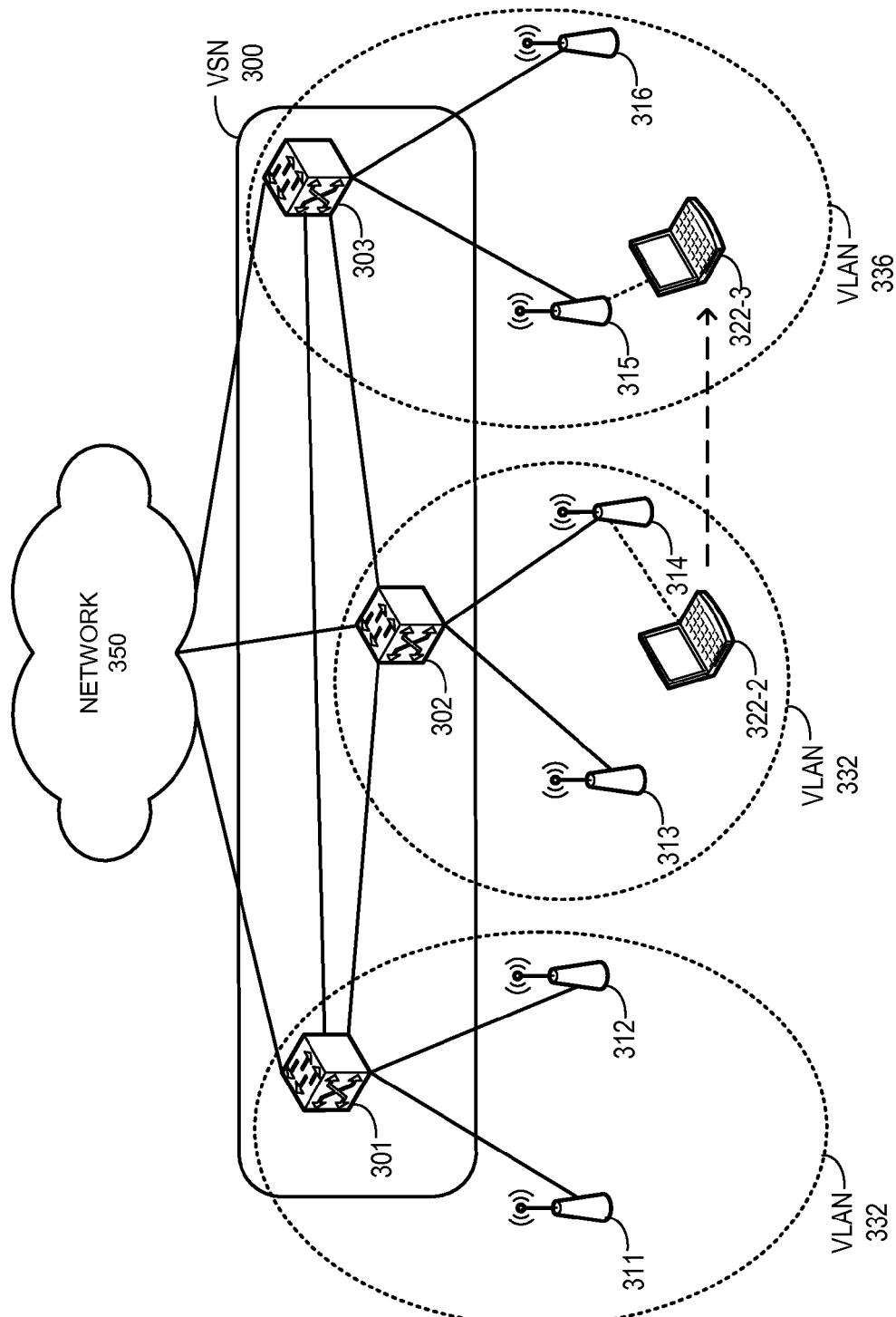
FIG. 3B illustrates an exemplary layer-3 roaming of a wireless end device between two wireless network controllers belonging to different VLANs, in accordance with an embodiment of the present invention.

FIG. 3B illustrates an exemplary layer-3 roaming of a wireless end device between two wireless network controllers belonging to different VLANs, in accordance with an embodiment of the present invention. During operation, end device 322 continues a wireless communication under the coverage of AP 314 (denoted as 322-2). After a while, end device 322 roams to the coverage of AP 315 (denoted as 322-3) and sends an association request to AP 315. AP 315 receives the request and forwards the request to controller 303. As controller 303 is not associated with VLAN 332, end device 322 is outside its VLAN. However, as controller 303 already contains the device information as well as its VLAN information associated with end device 322, the controller instructs AP 315 to allow the association with end device 322. Controller 303 then assigns itself as a "foreign" controller and informs other controllers about the new association. In some embodiments, the device information also includes foreign controller information associated with an end device. Consequently, data communication from end device 322 to network 350 continues via AP 315 and wireless network controller 303.

FIG. 3C illustrates an update to a device information database for layer-2 roaming, in accordance with an embodiment of the present invention. In FIG. 3C, entry 370 is associated with end device 322-1 in FIG. 3A. Entry 370 contains an identifier to end device 322, and corresponding MAC address

381, VLAN 332, IP address 382, SSID 399, home wireless network controller 301, multicast IP address 383, and AP 311, as described in conjunction with FIG. 3A. The entry associated with end device 322 is updated after a layer-2 roaming (denoted as 322-2), as described in conjunction with FIG. 3A. The layer-2 roaming of end device 322 is reflected in updated entry 380 that contains the updated home wireless network controller 302 and associated AP 314. FIG. 3D illustrates an update to a device information database for layer-3 roaming, in accordance with an embodiment of the present invention. Entry 390 associated with end device 322 is updated after a layer-3 roaming (denoted as 322-3), as described in conjunction with FIG. 3B. Especially, as layer-3 roaming involves moving in to the coverage of a foreign wireless network controller, entry 390 contains a record of a foreign controller. The layer-3 roaming of end device 322 is reflected in updated entry 390 that contains the updated foreign wireless network controller 303 and associated AP 315.

Frame Processing

Figure 4A:
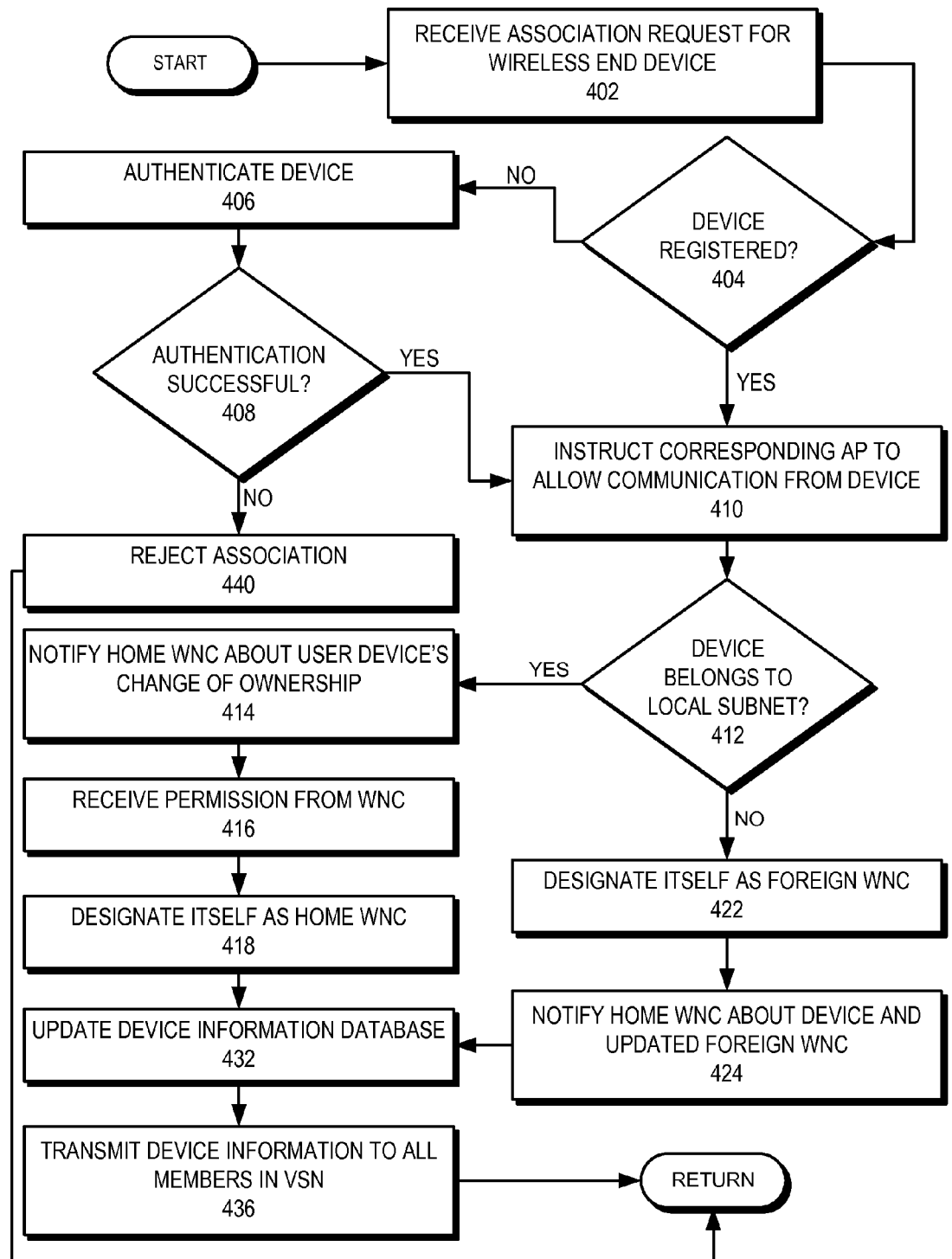
FIG. 4A presents a flowchart illustrating the process of a wireless network controller associating a wireless end device, in accordance with an embodiment of the present invention.

FIG. 4A presents a flowchart illustrating the process of a wireless network controller associating a wireless end device, in accordance with an embodiment of the present invention. Upon receiving an association request from an end device (operation 402), the controller determines whether the device is already registered based on a local device information database which contains device information learned locally from other controllers in the virtual service network (operation 404). If the device is not already registered, then the controller authenticates for the device (operation 406). In some embodiments, the virtual service network is coupled to an authentication server and the controller authenticates the device via the authentication server. If the authentication is not successful (operation 408), then the device is not considered to be legitimate and the request for association is rejected (operation 440).

If the device is already registered (operation 404) or successfully authenticated (operation 408), then the controller instructs the corresponding AP covering the device to allow communication from the device (operation 410). The controller then checks whether the device belongs to a subnet associated with the controller (operation 412). If so, the device is in its own subnet and the controller can be the home wireless network controller for the device. Consequently, the controller notifies the current home controller about the newly associated device for a change of ownership (operation 414). The current home controller permits the controller to be assigned as the new home controller. In turn, the controller receives the permission (operation 416) and designates itself as the home controller for the device (operation 418). Note that if no current home controller is assigned for the device, then the controller can be assigned the home controller without retrieving the permission.

If the device does not belong to a subnet associated with the controller (operation 412), then the controller designates itself as a foreign controller (operation 422) and notifies the home controller about the new association of the device and the new foreign controller (operation 424). Note that if no current home controller is assigned for the device, then a controller associated with the subnet to which the device belongs can be assigned as the home controller. When the controller is designated as either the home controller (operation 418) or the foreign controller (operation 422) for the device, the controller updates the device information database with the new device information (operation 432). Finally, the controller transmits the device information to all other controllers in the virtual service network (operation 436). All other controllers update their device information database accordingly.

Figure 4B:
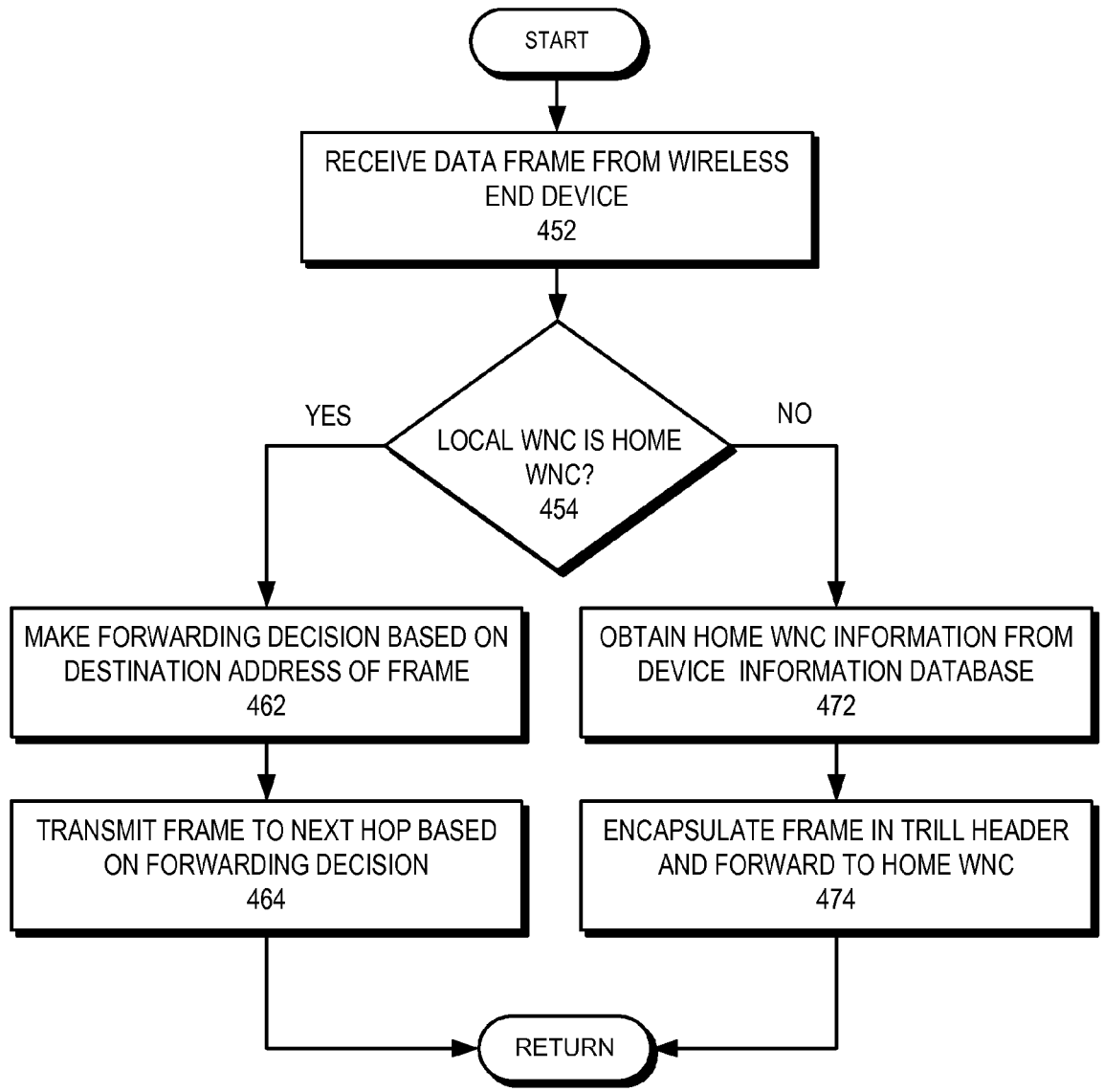
FIG. 4B presents a flowchart illustrating the process of a wireless network controller forwarding a data frame received from a wireless end device, in accordance with an embodiment of the present invention.

FIG. 4B presents a flowchart illustrating the process of a wireless network controller forwarding a data frame received from a wireless end device, in accordance with an embodiment of the present invention. Upon receiving a data frame from a wireless end device (operation 452), the controller checks whether the local controller is the home controller for the device (operation 454). If so, the controller makes a forwarding decision based on the destination of the frame (operation 462) and forwards the frame to the next hop based on the forwarding decision (operation 464). If the controller is not the home controller, then the controller obtains the home controller information from the device information database (operation 472), and encapsulates the frame in a TRILL header and forwards the frame to the home controller (operation 474).

VLAN Forwarding

Figure 5A:
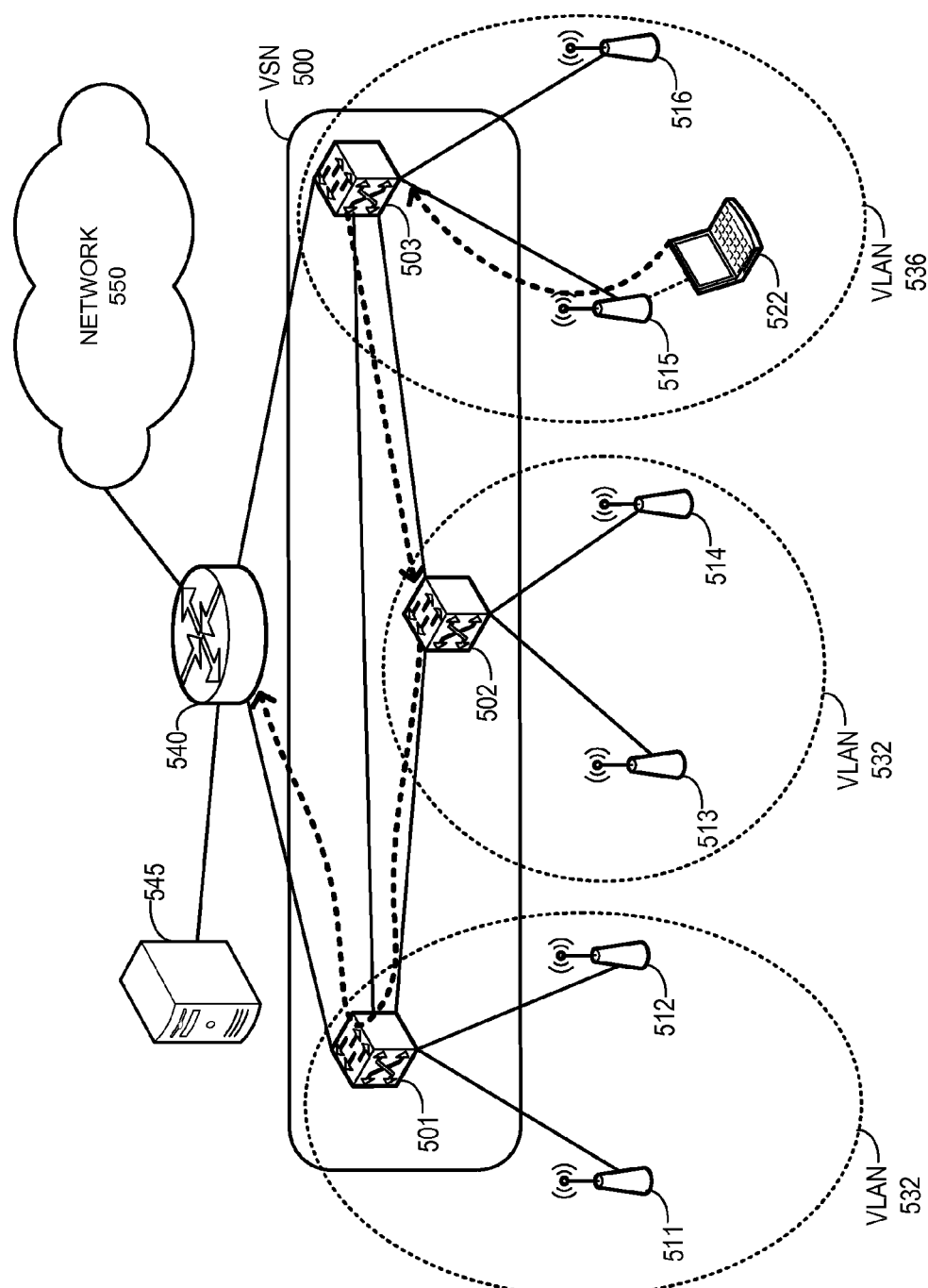
FIG. 5A illustrates an example of data forwarding from a wireless end device via a plurality of wireless network controllers belonging to different VLANs, in accordance with an embodiment of the present invention.

The converged wireless LAN is designed to provide anytime, anywhere service to each legitimate wireless end device. However, an end device may initiate a communication under the coverage of an AP coupled to a wireless network controller, wherein the controller is not associated with the VLAN to which the device belongs. Under this scenario, it is essential for the controller to provide service to the end device. FIG. 5A illustrates an example of data forwarding from a wireless end device via a plurality of wireless network controllers belonging to different VLANs, in accordance with an embodiment of the present invention. In this example, virtual service network 500 includes wireless network controllers 501, 502, and 503. APs 511 and 512 are coupled to controller 501, APs 513 and 514 are coupled to controller 502, and APs 515 and 516 are coupled to controller 503. Wireless network controllers 501 and 502 are associated with VLAN 532, and controller 503 is associated with VLAN 536. End device 522 is configured to be part of VLAN 532. Layer-3 router 540 couples wireless network controllers 501 and 503 to network 550. Authentication server 545 is coupled to router 540 and used for authenticating an end device.

During operation, end device 522 initiates a communication under the coverage of AP 515. End device 522 sends an association request to AP 515. However, controller 503 is not associated with VLAN 532, to which end device 522 belongs. AP 515 sends the association request to controller 503. Since it is the first login to the wireless LAN for end device 522, controller 503 considers end device 522 to be a new device. Controller 503 then facilitates end device 522 to authenticate with server 545. After successful authentication with server 545, end device 522 becomes part of VLAN 532 while remaining associated with VLAN 536. As controller 502 is associated with VLAN 532, controller 503 sends a VLAN association message to controller 502, and assigns controller 502 as the home controller and controller 503 as the foreign controller. Controller 502 then updates the device information database and informs all other controllers regarding the new association.

When end device 522 communicates with network 550, controller 503 encapsulates a data frame from end device 522 in a TRILL header and forwards them to controller 502. Controller 502, in turn, removes the TRILL encapsulation, examines the frame, and makes a forwarding decision based on the destination of the frame. In this example, controller 502 encapsulates the frame in a TRILL header with an egress RBridge identifier corresponding to controller 501 and an outer layer-2/layer-3 header with a destination address corresponding to router 540. Controller 502 then forwards the frame to network 550 via egress controller 501.

Figure 5B:
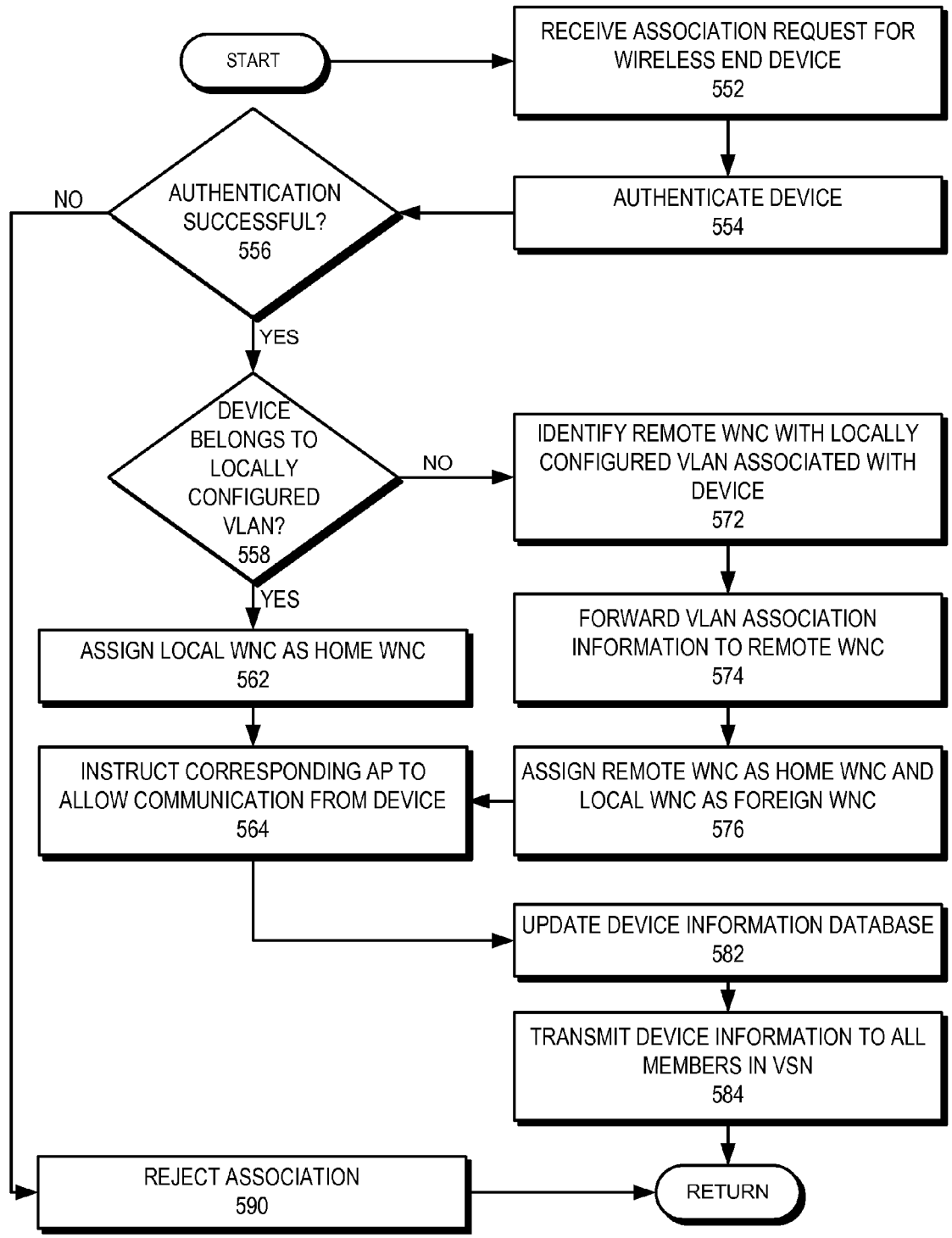
FIG. 5B presents a flowchart illustrating the process of a wireless network controller associating a wireless end device, wherein the end device may belong to a VLAN which is not locally configured, in accordance with an embodiment of the present invention.

FIG. 5B presents a flowchart illustrating the process of a wireless network controller associating a wireless end device, wherein the end device may belong to a VLAN which is not locally configured, in accordance with an embodiment of the present invention. Upon receiving an association request from a wireless end device (operation 552), the controller authenticates the device (operation 554). If the authentication is not successful (operation 556), then the device is not considered to be legitimate and the request for association is rejected (operation 590).

If the device is successfully authenticated (operation 556), the controller then checks whether the device belongs to a VLAN associated with the controller (operation 558). If so, the controller assigns the local controller as the home controller for the device (operation 562) and instructs the corresponding AP covering the device to allow communication from the device (operation 564). If the device does not belong to a VLAN associated with the controller (operation 558), then the controller identifies a remote controller associated with the VLAN (operation 572) and forwards the VLAN association information to the remote controller (574). The controller assigns the local controller as a foreign controller and the remote controller as the home controller (operation 576) and instructs the corresponding AP covering the device to allow communication from the device (operation 564). The controller then updates the device information database with the information of the end device (operation 582) and transmits the device information to all other controllers in the virtual service network (operation 584). All other controllers update their device information database accordingly.

Guest Access

A guest network serves many important business purposes, such as providing network access to all guests (e.g., vendors and business partners). Any guest traffic has to be restricted to only Internet access while preventing all forms of internal communications with the native users. The converged wireless LAN architecture should provide a guest with instant access to the Internet. A guest network can be configured as a separate VLAN and all or a few selected APs may broadcast a separate identifier associated with the guest network. FIG. 6A illustrates an exemplary access process of a guest wireless end device using infrastructure, in accordance with an embodiment of the present invention. In this example, virtual service network 600 includes wireless network controllers 601, 602, and 603. APs 611 and 612 are coupled to controller 601, APs 613 and 614 are coupled to controller 602, and APs 615 and 616 are coupled to controller 603. Wireless network controller 602 is associated with VLAN 632 and controller 603 is associated with VLAN 634. Controller 601 is associated with guest VLAN 638. Layer-3 router 640 couples wireless network controllers 601 and 603 to network 650. Authentication server 645 is coupled to router 640 and used for authenticating an end device.

Since all controllers are connected together in the virtual service network 600 and network details are shared among the controllers, it is sufficient to configure only one controller (in this example, controller 601) to provide the guest access. During operation, guest end device 622 sends an association request to AP 615. AP 615 sends the association request to controller 603. In some embodiments, the guest device is authenticated via server 645. In some other embodiments, controller 601 is responsible for authenticating a guest device. After the authentication, AP 615 receives the authentication confirmation from controller 603 and associates guest device 622 with the guest network. Since end device 622 is a guest, it is a part of VLAN 638. However, end device 622 is associated with VLAN 634. Consequently, controller 603 sends the VLAN association information to controller 601, and assigns controller 601 as the home controller and controller 603 as the foreign controller. Controller 603 then updates the device information database and informs all other controllers about the update. AP 615 forwards a frame destined to network 650 from guest device 622 to controller 603, since controller 603 is the foreign controller. Controller 603 then encapsulates the frame in a TRILL header with an egress RBridge identifier corresponding to controller 601 and sends the frame to controller 601 over network 600. Controller 601, in turn, forwards the frame toward network 650. In some embodiments, the wired network coupled to virtual service network 600 is configured to provision the guest network. In some other embodiments, only the converged wireless LAN is provisioned to support the guest network.

FIG. 6B illustrates an entry to a device information database for a guest device, in accordance with an embodiment of the present invention. The entry in FIG. 6B is associated with guest end device 622, as described in conjunction with FIG. 3B. Especially, since guest end device 622 is part of VLAN 638 while being associated with VLAN 634, the entry contains controller 601 as the home controller and controller 603 as the foreign controller. The guest access of end device 622 is reflected in the entry and consequently the entry contains an identifier to end device 622, and corresponding MAC address 691, VLAN 638, IP address 692, SSID 698, home wireless network controller 601, foreign wireless network controller 603, multicast IP address 693, and AP 615. In some embodiments, SSID 698 is used for guest access in a virtual service network. A respective AP configured to allow guest access may broadcast SSID 698. During operation, any guest device, such as end device 622, can send a request for association using SSID 698 and be granted guest access.

Figure 6C:
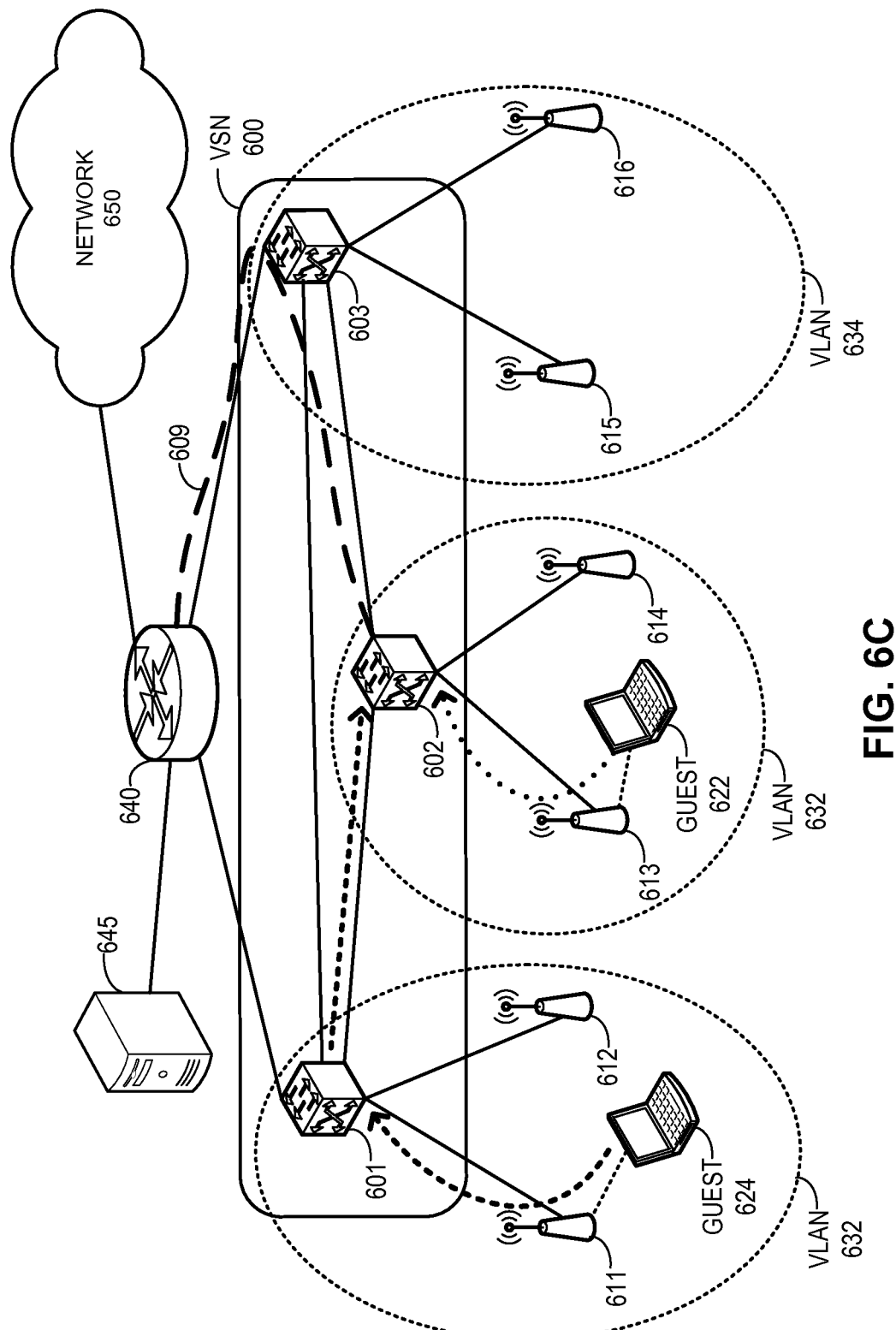
FIG. 6C illustrates an exemplary access process of a guest wireless end device using tunneling, in accordance with an embodiment of the present invention.

FIG. 6C illustrates an exemplary access process of a guest wireless end device using tunneling, in accordance with an embodiment of the present invention. A tunnel 609 is first established from one of the controllers (in this example, controller 602) to router 640. The information about this tunnel is shared across network 600. During operation, guest end device 622 sends an association request to AP 613. AP 613 sends the association request to controller 602. After authentication, all communication to network 650 from guest device 622 goes through controller 602 and tunnel 609. For example, when another guest end device 624 is authenticated and associated with AP 611, controller 601 becomes the foreign controller for end device 624. All communication to network 650 from guest device 624 is sent to controller 601. Controller 601 then encapsulates the frame in a TRILL header with an egress RBridge identifier corresponding to controller 602 and sends the frame to controller 602 over network 600. Controller 602, in turn, forwards the frame toward network 650 over tunnel 609. In some embodiments, router 640 is configured to provide quality of service control for the traffic through tunnel 609.

Handling ARP and Multicast

Figure 7:
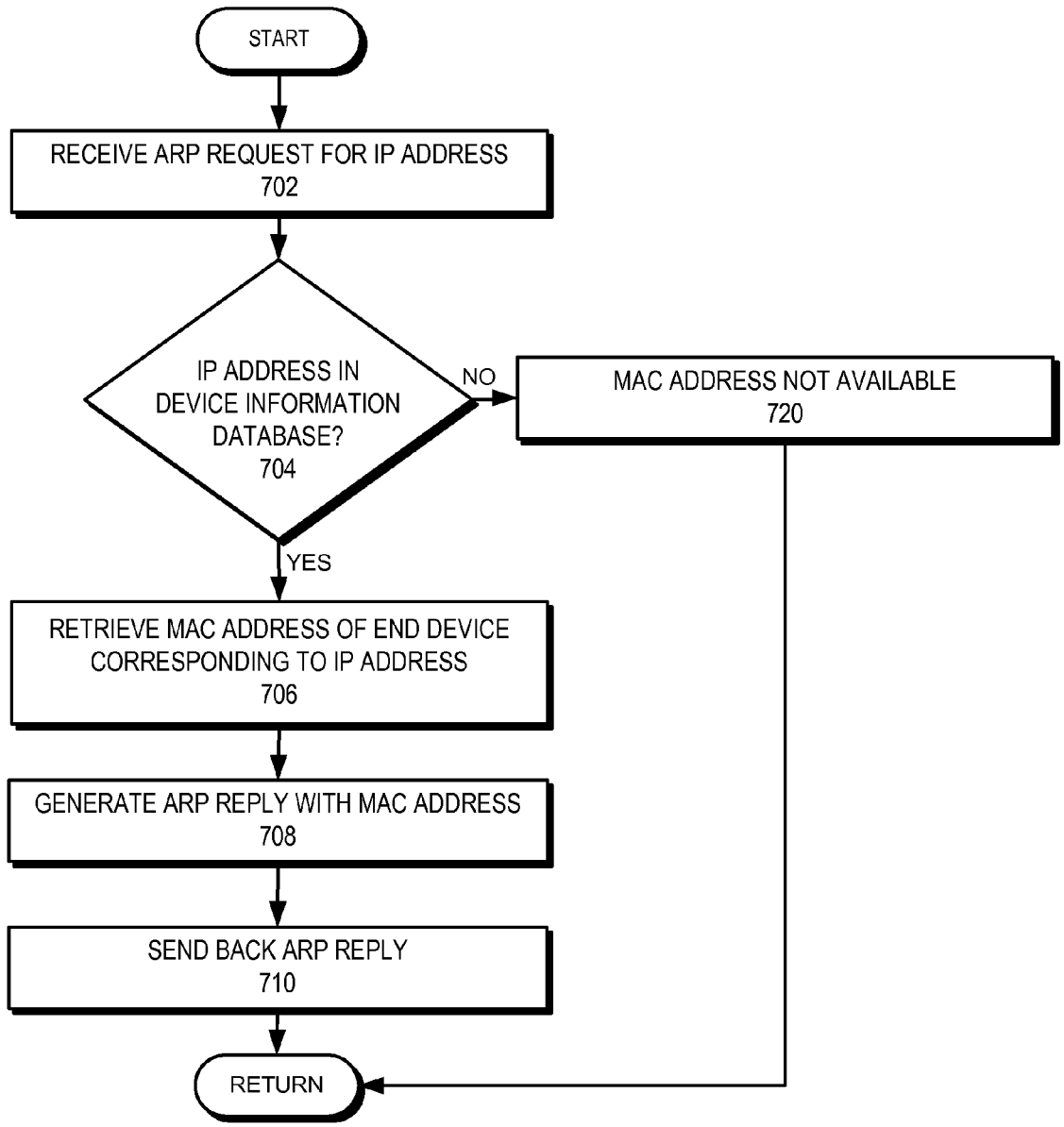
FIG. 7 presents a flowchart illustrating the process of a wireless network controller responding to an ARP request, in accordance with an embodiment of the present invention.

In the converged wireless LAN, it is assumed that there is no unknown MAC address. When a wireless end device associates with an AP, the device information is known to all controllers. Hence during the ARP resolution for an end device, the MAC address should be found in any controller. FIG. 7 presents a flowchart illustrating the process of a wireless network controller responding to an ARP request, in accordance with an embodiment of the present invention. Upon receiving an ARP request (operation 702) for an IP address, the controller checks whether the device information database contains an entry corresponding to the IP address (operation 704). If not, then the MAC address is not available (operation 720). Otherwise, the controller retrieves the MAC address of the device corresponding to the IP address from the device information database (operation 706), generates the ARP reply (operation 708), and sends back the ARP reply (operation 710).

Since each wireless network controller knows about each end device associated with the converged wireless LAN, a controller can make intelligent decisions regarding multicast forwarding. Hence, whenever an AP receives a multicast packet originating from a wireless end device, the AP forwards the packet to the associated wireless network controller. Similarly, a multicast packet arriving from outside of the converged wireless LAN is received by a controller. The controller, in turn, forwards the multicast traffic. Furthermore, if the controller is the first home controller that receives a join request for a multicast group, the controller becomes the multicast group controller for the group. The multicast group controller is responsible for distributing all multicast packets for the multicast group.

Figure 8A:
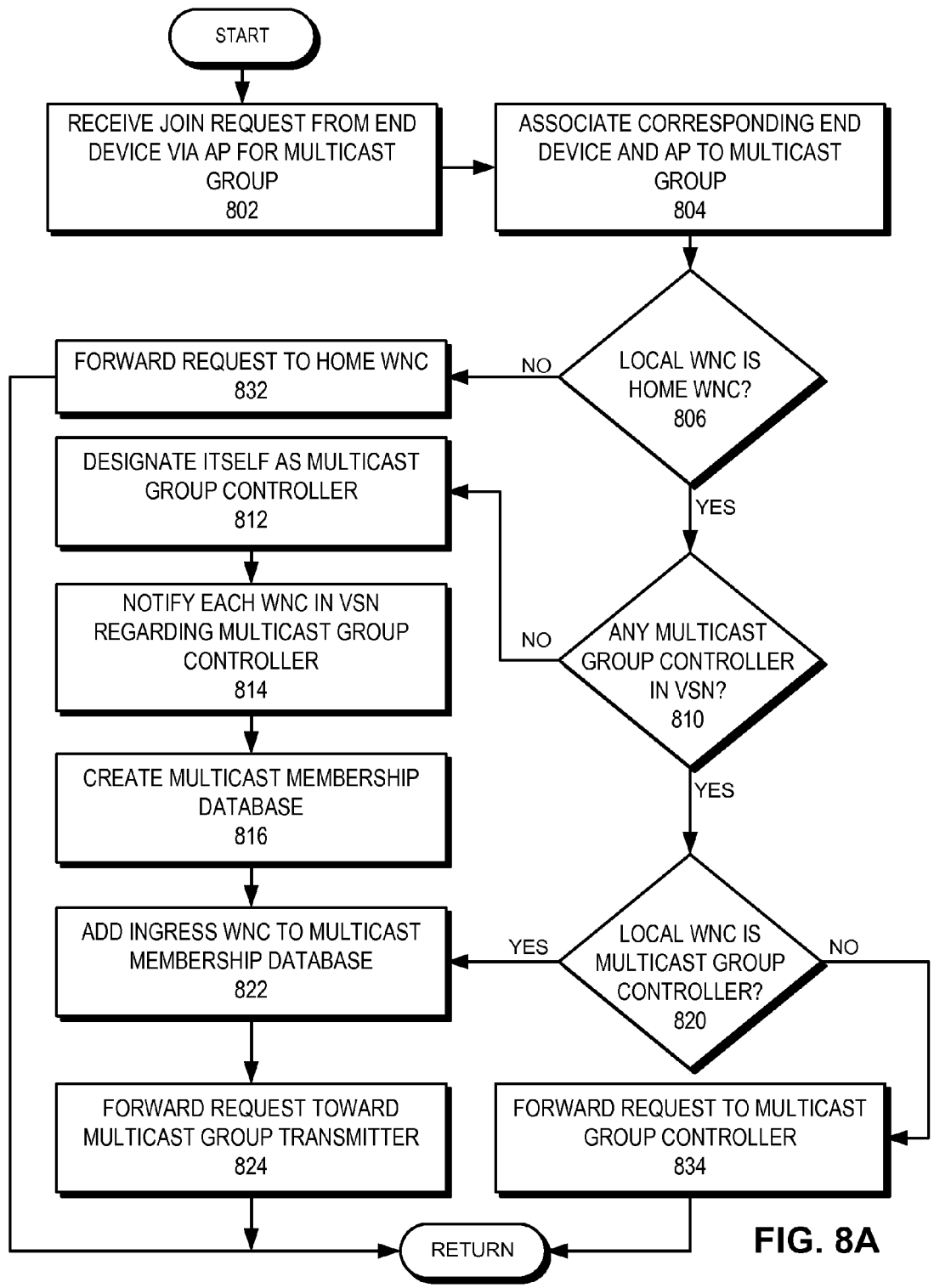
FIG. 8A presents a flowchart illustrating the process of a wireless network controller responding to a join request from a wireless end device for a multicast group, in accordance with an embodiment of the present invention.

FIG. 8A presents a flowchart illustrating the process of a wireless network controller responding to a join request from a wireless end device for a multicast group, in accordance with an embodiment of the present invention. Upon receiving a join request from a wireless end device via an AP for a multicast group (operation 802), the controller associates the end device and the AP with the multicast group (operation 804) and checks whether the local controller is the home controller for the end device (operation 806). In some embodiments, the controller maintains a local multicast database to store the multicast group membership information (e.g., multicast group controller). If the local controller is not the multicast group controller, then the controller forwards the join request to the home controller (operation 832). Otherwise, the controller checks whether there is any multicast group controller for the multicast group in the virtual service network (operation 810). If not, the local controller becomes the multicast group controller (operation 812) and notifies all other controllers in the network regarding the multicast group controller (operation 814). The controller then creates a multicast membership database for the group (operation 816) and adds the local controller to the database (operation 822). If there is a multicast group controller for the multicast group in the virtual service network (operation 810), the controller checks whether the local controller is the multicast group controller (operation 820). If not, the controller forwards the request to the multicast group controller (operation 834). Otherwise, the controller adds the ingress controller (the controller associated with the end device) to the multicast membership database (operation 822). After adding a member to the database, the controller forwards the request toward the transmitter(s) of the multicast packets of the group (operation 824).

Figure 8B:
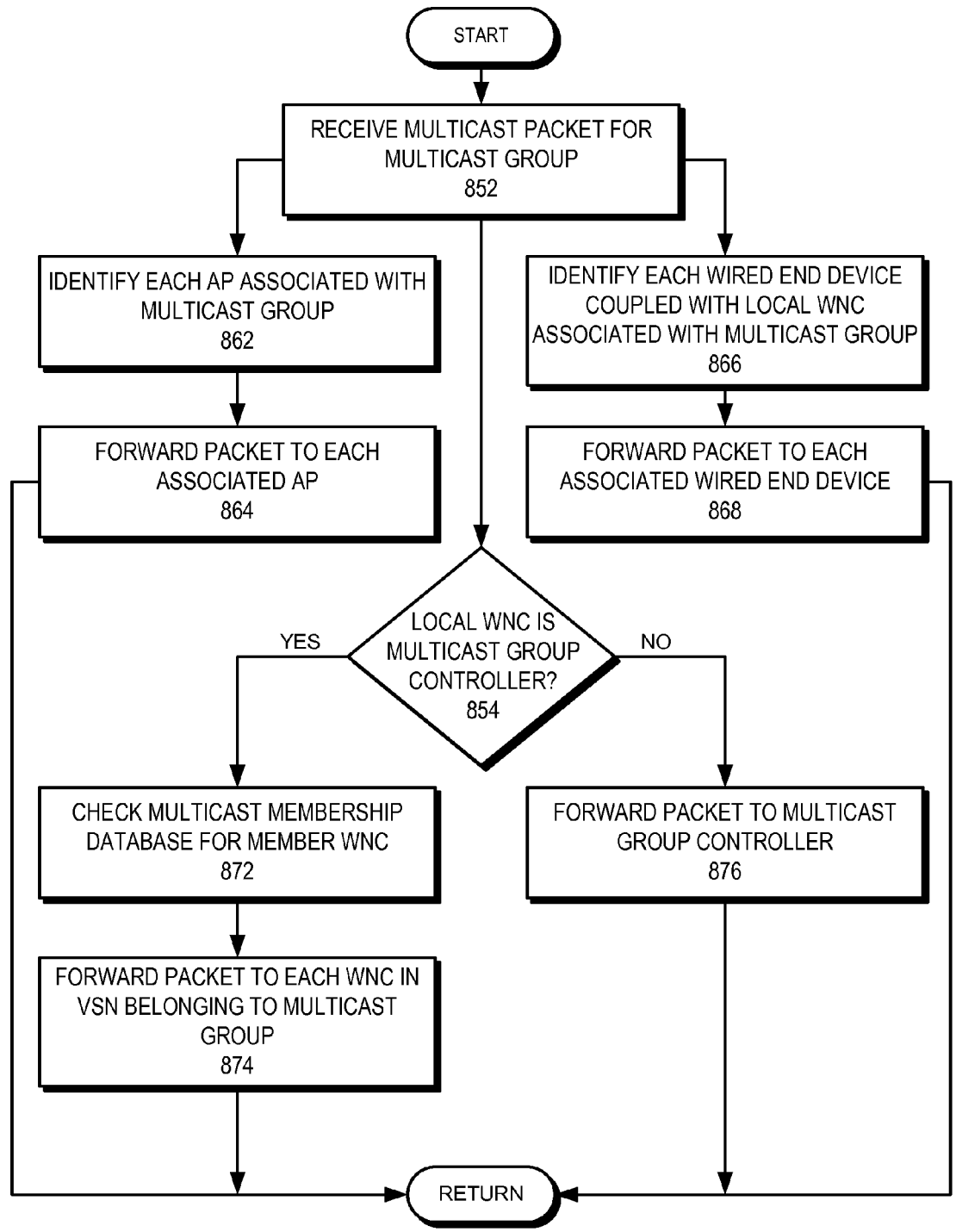
FIG. 8B presents a flowchart illustrating the process of a wireless network controller forwarding a multicast packet for a multicast group, in accordance with an embodiment of the present invention.

FIG. 8B presents a flowchart illustrating the process of a wireless network controller forwarding a multicast packet for a multicast group, in accordance with an embodiment of the present invention. Upon receiving a multicast packet for a group (operation 852), the controller identifies each AP associated with the group (operation 862) and forwards the packet to each associated AP (operation 864). The controller also identifies each wired end device coupled to the controller associated with the group (operation 866) and forwards the packet to each associated wired end device (operation 868). The controller checks whether the local controller is the controller for the group (operation 854). If not, the controller forwards the packet to the multicast group controller (operation 876). Otherwise, the controller checks the multicast membership database for member wireless network controllers for the group (operation 872) and forwards the packet to each controller belonging to the multicast group (operation 874).

Figure 8D:
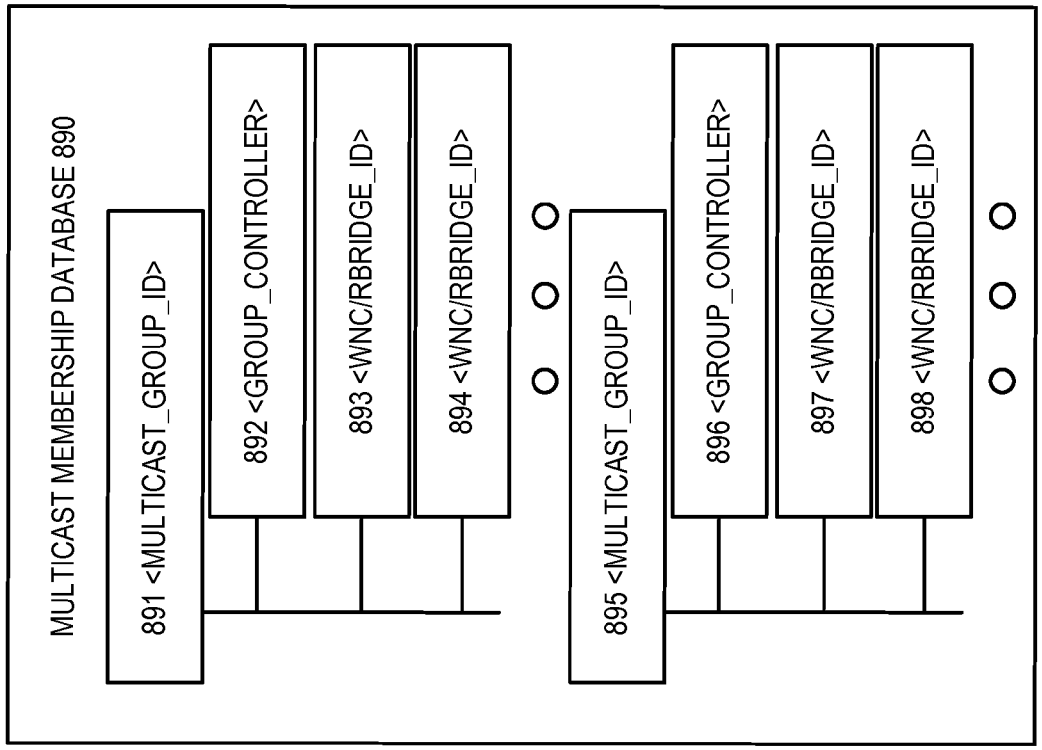
FIG. 8D illustrates an exemplary multicast membership database, in accordance with an embodiment of the present invention.
Figure 8C:
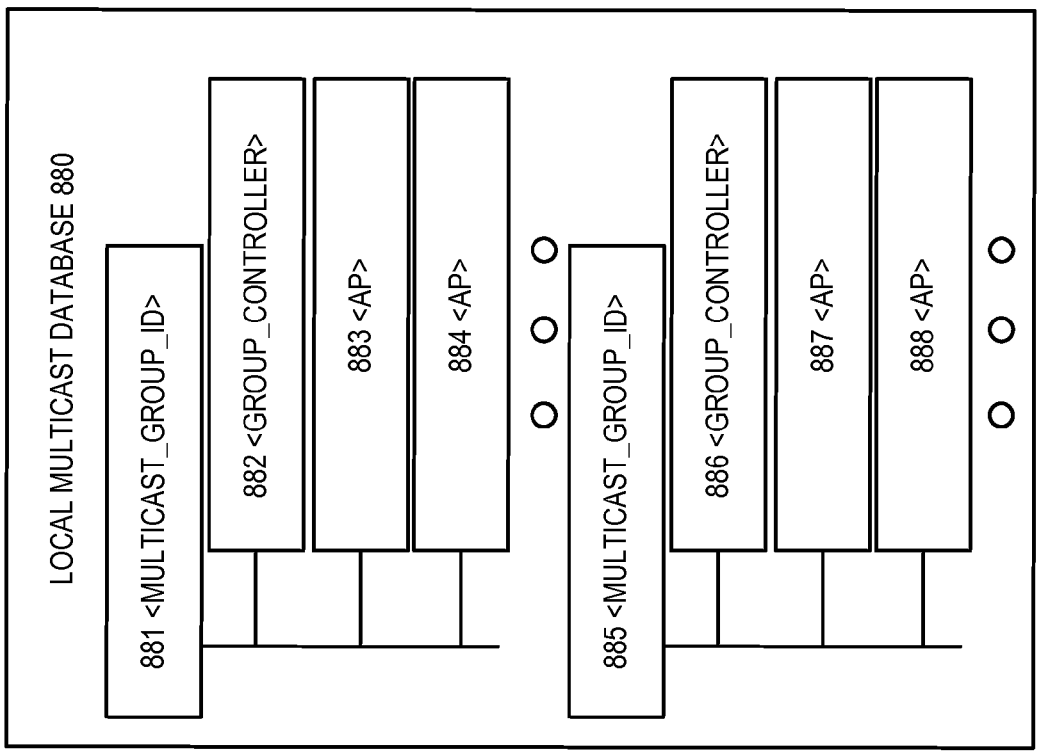
FIG. 8C illustrates an exemplary data structure for a database that stores locally learned multicast group membership information, in accordance with an embodiment of the present invention.

FIG. 8C illustrates an exemplary data structure for a database that stores locally learned multicast group membership information, in accordance with an embodiment of the present invention. Local multicast database 880 in FIG. 8C stores records for each multicast group and is maintained at each wireless network controller. For example, database 880 stores records 881 and 885 for different multicast groups, each containing an identifier for the multicast group, an identifier to the multicast group controller, and a list of local APs associated with the multicast group. In database 880, records 881 and 885 are for different multicast groups. Record 882 stores an identifier to the multicast group controller, and records 883 and 884 store AP information associated with the multicast group corresponding to record 881. Similarly record 886 stores an identifier to the multicast group controller, and records 887 and 888 store AP information associated with the multicast group corresponding to record 885. FIG. 8D illustrates an exemplary multicast membership database, in accordance with an embodiment of the present invention. Multicast membership database 890 stores records for multicast groups learnt from remote RBridges. For example, database 890 includes records 891 and 895 that store identifiers for two different remote multicast groups. Records 891 and 895 include an identifier for the multicast group, an identifier to the multicast group controller, and identifiers to other controllers with a membership to the multicast group. For example, record 892 stores an identifier to the multicast group controller, and records 893 and 894 store identifiers to controllers that are coupled to end devices associated with the multicast group corresponding to record 891. Similarly, record 896 stores an identifier to the multicast group controller, and records 897 and 898 store identifiers to controllers that are coupled to end devices associated with the multicast group corresponding to record 895.

Exemplary Switch System

Figure 9:
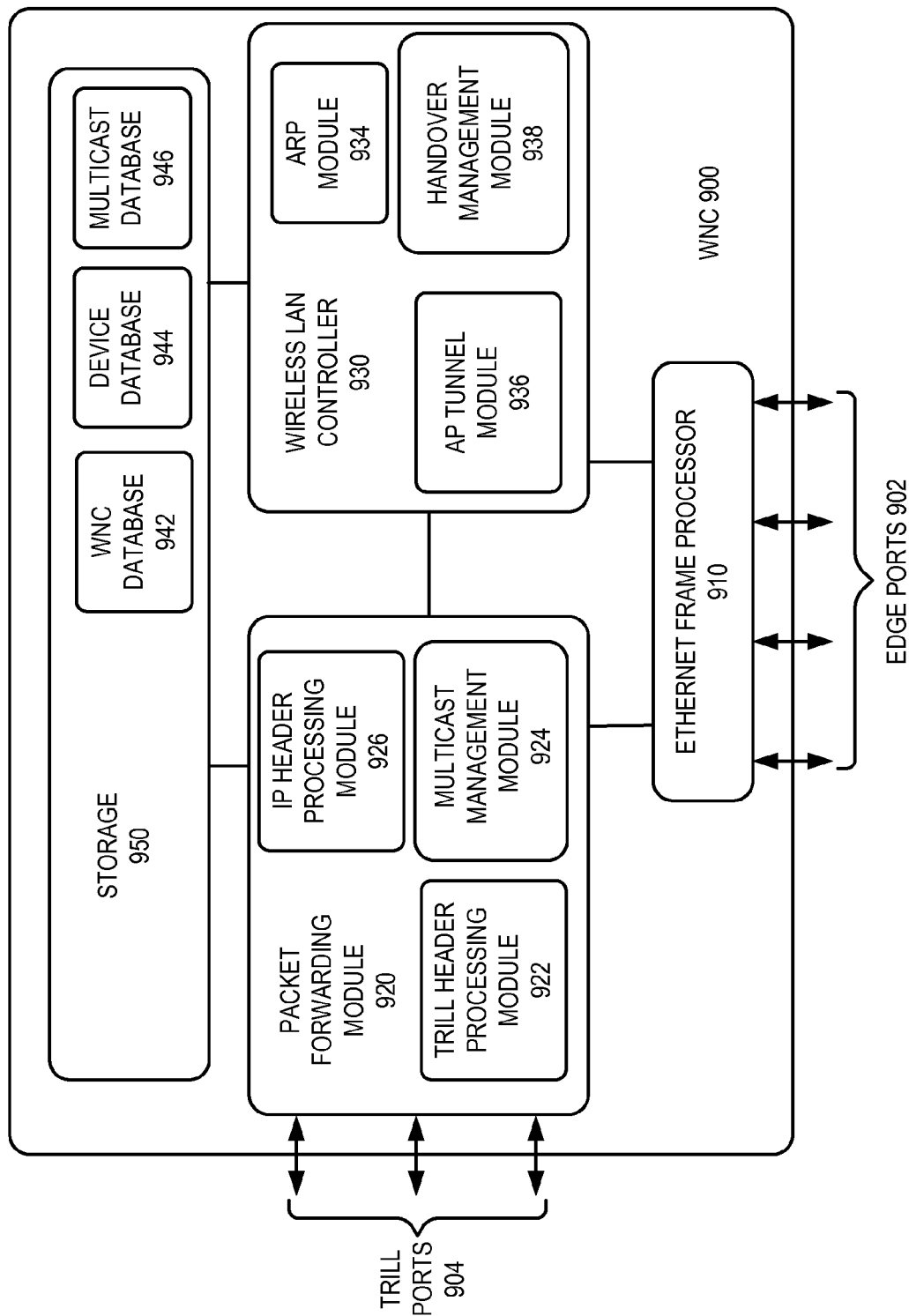
FIG. 9 illustrates an exemplary architecture of a wireless network controller capable of processing TRILL packets and participating in a converged wireless LAN, in accordance with an embodiment of the present invention.

FIG. 9 illustrates an exemplary architecture of a wireless network controller capable of processing TRILL packets and participating in a converged wireless LAN, in accordance with an embodiment of the present invention. In this example, a wireless network controller 900 includes number of edge ports 902, a number of TRILL ports 904, a packet forwarding module 920, a wireless LAN controller 930, an Ethernet frame processor 910, and a storage 950. Packet forwarding module 920 further includes a TRILL header processing module 922 and a multicast management module 924. Wireless LAN controller 930 further includes an AP tunnel module 936 and a handover management module 938.

TRILL ports 904 include inter-switch communication channels for communication with one or more wireless network controllers. This inter-switch communication channel can be implemented via a regular communication port and based on any open or proprietary format. Furthermore, the inter-switch communication between controllers is not required to be direct port-to-port communication.

During operation, TRILL ports 904 receive TRILL frames from (and transmit frames to) other controllers. TRILL header processing module 922 processes TRILL header information of the received frames and performs routing on the received frames based on their TRILL headers. Packet forwarding module 920 forwards frames in the TRILL network toward other controllers. Edge ports 902 receive frames from (and transmit frames to) APs. Ethernet frame processor 910 extracts and processes header information from the received frames. Ethernet frame processor 910 forwards the frames to packet forwarding module 920 and wireless LAN controller 930. AP tunnel module 936 is responsible for receiving frames from APs. Handover management module 938 determines whether the associated wireless end device from which the packet is received is roaming by checking controller database 942 and device database 944. Multicast management module 924, in conjunction with multicast database 946 in storage 950, manages multicast group information and determines how multicast packets are distributed. Storage 950 can also include TRILL and IP routing information.

In some embodiments, wireless network controller 900 may include an IP header processing module 926, as described in conjunction with FIGS. 2B and 2C. IP header processing module 926 communicates with other controllers coupled over physical layer-3 networks. In some embodiments, wireless network controller 900 may include an ARP module 934. Upon receiving an ARP query for an end device, ARP module 934 looks up the MAC address of the device in device database 944 and sends a reply.

Note that the above-mentioned modules can be implemented in hardware as well as in software. In one embodiment, these modules can be embodied in computer-executable instructions stored in a memory which is coupled to one or more processors in gateway RBridge 900. When executed, these instructions cause the processor(s) to perform the aforementioned functions.

In summary, embodiments of the present invention provide a wireless network controller, a method, and a system for creating a converged wireless LAN, wherein the wireless network controllers are coupled to each other over a logical TRILL network called a virtual service network. In one embodiment, the wireless network controller includes a data structure, a tunnel management scheme, an encapsulation mechanism, and a forwarding mechanism. The data structure stores a TRILL RBridge identifier associated with a remote wireless network controller. The tunnel management mechanism maintains a tunnel with a local access point, and the encapsulation mechanism encapsulates a packet received from the tunnel with a TRILL header which includes the RBridge identifier of the remote wireless network controller. The forwarding mechanism forwards the encapsulated packet.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A first wireless network controller, comprising:
control circuitry configured to store a first media access control (MAC) address and an associated identifier of a virtual local area network (VLAN) of a first end device learned at a second wireless network controller in a first data structure in association with a switch identifier of the second wireless network controller, wherein the VLAN is not locally configured; and
tunnel management circuitry configured to maintain a tunnel between the first wireless network controller and a first access point local to the first wireless network controller; and
multicast management circuitry configured to:
identify via the tunnel a join request to a first multicast group from a second end device prior to the second wireless network controller identifying a join request to the first multicast group;
elect the first wireless network controller for distributing multicast traffic of the first multicast group; and
store in a second data structure membership information of the first multicast group and an identifier of the first access point in association with a switch identifier of the first wireless network controller.

2. The first wireless network controller of claim 1, wherein the control circuitry is further configured to store in the first data structure identifying information of a second access point associated with the first MAC address, wherein the second access point is coupled to the second wireless network controller.

3. The first wireless network controller of claim 2, wherein the tunnel management circuitry is further configured to instruct the first access point to accept and process data packets from an end device associated with the first MAC address, wherein the data packets include the identifier of the VLAN.

4. The first wireless network controller of claim 2, further comprising handover management circuitry configured to notify the second wireless network controller about the first end device being wirelessly coupled to the first access point, wherein the first end device is authenticated at the second wireless network controller.

5. The first wireless network controller of claim 1, wherein the processing circuitry is further configured to identify a packet encapsulated with an inner Ethernet header and an outer header, wherein the outer header comprises one or more of: a Transparent Interconnection of Lots of Links (TRILL) header, a layer-2 header, and a layer-3 header.

6. The first wireless network controller of claim 1, further comprising Address Resolution Protocol (ARP) circuitry configured to respond to an ARP request for the first end device associated with the first MAC address.

7. The first wireless network controller of claim 1, further comprising encapsulation circuitry configured to encapsulate a packet received from the tunnel with a header, which includes the switch identifier of the second wireless network controller as the egress switch identifier, wherein the packet includes the first MAC address as the destination address.

8. A method, comprising:
storing, by a first wireless network controller, a first media access control (MAC) address and an associated identifier of a virtual local area network (VLAN) of a first end device learned at a second wireless network controller in a first data structure in association with a switch identifier of the second wireless network controller, wherein the VLAN is not locally configured;

maintaining a tunnel between the first wireless network controller and a first access point local to the first wireless network controller;

identifying via the tunnel a join request to a first multicast group from a second end device prior to the second wireless network controller identifying a join request to the first multicast group;

electing the first wireless network controller for distributing multicast traffic of the first the multicast group; and storing in a second data structure membership information of the first multicast group and an identifier of the first access point in association with a switch identifier of the first wireless network controller.

9. The method of claim 8, further comprising storing in the first data structure identifying information of a second access point associated with the first MAC address, wherein the second access point is coupled to the second wireless network controller.

10. The method of claim 9, wherein the method further comprising instructing the first access point to accept and process data packets from an end device associated with the first MAC address, wherein the data packets include the identifier of the VLAN.

11. The method of claim 9, further comprising notifying the second wireless network controller about the first end device being wirelessly coupled to the first access point, wherein the first end device is authenticated at the second wireless network controller.

12. The method of claim 8, further comprising identifying a packet encapsulated with an inner Ethernet header and an outer header, wherein the outer header comprises one or more of: a Transparent Interconnection of Lots of Links (TRILL) header, a layer-2 header, and a layer-3 header.

13. The method of claim 8, further comprising responding to an Address Resolution Protocol (ARP) request for the first end device associated with the first MAC address.

14. The method of claim 8, further comprising encapsulating a packet received from the tunnel with a header, which includes the switch identifier of the second wireless network controller as the egress switch identifier, wherein the packet includes the first MAC address as the destination address.

15. A computing system, comprising:
a processor; and
a non-transitory computer-readable storage medium storing instructions which when executed by the processor causes the processor to perform a method, the method comprising:
storing a first media access control (MAC) address and an associated identifier of a virtual local area network (VLAN) of a first end device learned at a remote wireless network controller in a first data structure in association with a switch identifier of the remote wireless network controller, wherein the VLAN is not locally configured;

maintaining a tunnel between the computing system and a first access point;

identifying via the tunnel a join request to a first multicast group from a second end device prior to the remote wireless network controller identifying a join request to the first multicast group;

electing the computing system for distributing multicast traffic of the first multicast group;

storing in a second data structure membership information of the first multicast group and an identifier of the first access point in association with a switch identifier of the computing system.

16. The computing system of claim 15, wherein the method further comprises storing in the first data structure identifying information of a second access point associated with the first MAC address, wherein the second access point is coupled to the remote wireless network controller.

17. The computing system of claim 16, wherein the method further comprises instructing the first access point to accept and process data packets from an end device associated with the first MAC address, wherein the data packets include the identifier of the VLAN.

18. The computing system of claim 16, wherein the method further comprises notifying the remote wireless network controller about the first end device being wirelessly coupled to the first access point, wherein the first end device is authenticated at the remote wireless network controller.

19. The computing system of claim 15, wherein the method further comprises identifying a packet encapsulated with an inner Ethernet header and an outer header, wherein the outer header comprises one or more of: a Transparent Interconnection of Lots of Links (TRILL) header, a layer-2 header, and a layer-3 header.

20. The computing system of claim 15, wherein the method further comprises responding to an Address Resolution Protocol (ARP) request for the first end device associated with the first MAC address.

21. The computing system of claim 15, wherein the method further comprises encapsulating a packet received from the tunnel with a header, which includes the switch identifier of the remote wireless network controller as the egress switch identifier, wherein the packet includes the first MAC address as the destination address.

* * * * *